United States Patent
Siminoff et al.

(10) Patent No.: US 10,733,857 B1
(45) Date of Patent: Aug. 4, 2020

(54) AUTOMATIC ALTERATION OF THE STORAGE DURATION OF A VIDEO

(71) Applicant: Amazon Technologies, Inc., Seattle, WA (US)

(72) Inventors: James Siminoff, Pacific Palisades, CA (US); Elliott Lemberger, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/169,434

(22) Filed: Oct. 24, 2018

Related U.S. Application Data

(60) Provisional application No. 62/577,401, filed on Oct. 26, 2017.

(51) Int. Cl.
*H04M 11/04* (2006.01)
*H04W 76/50* (2018.01)
*G08B 13/196* (2006.01)

(52) U.S. Cl.
CPC . *G08B 13/19676* (2013.01); *G08B 13/19615* (2013.01); *G08B 13/19684* (2013.01); *H04W 76/50* (2018.02)

(58) Field of Classification Search
USPC .......................................................... 379/37
See application file for complete search history.

(56) References Cited

U.S. PATENT DOCUMENTS

| 7,113,090 | B1* | 9/2006 | Saylor | G08B 13/19682 |
| | | | | 340/5.33 |
| 7,382,244 | B1* | 6/2008 | Donovan | G08B 13/19645 |
| | | | | 340/506 |
| 9,979,924 | B1* | 5/2018 | Fink | H04W 4/90 |
| 2003/0012344 | A1* | 1/2003 | Agarwal | H04M 11/04 |
| | | | | 379/37 |
| 2005/0271251 | A1* | 12/2005 | Russell | G06K 9/00288 |
| | | | | 382/103 |
| 2014/0368601 | A1* | 12/2014 | deCharms | H04W 4/021 |
| | | | | 348/14.02 |
| 2015/0098685 | A1* | 4/2015 | Hu | H04N 7/183 |
| | | | | 386/224 |
| 2018/0091569 | A1* | 3/2018 | Roth | H04N 21/2143 |
| 2018/0101735 | A1* | 4/2018 | Lemberger | H04N 5/77 |

FOREIGN PATENT DOCUMENTS

KR 20060034898 A 4/2006

\* cited by examiner

*Primary Examiner* — Quoc D Tran
(74) *Attorney, Agent, or Firm* — Greenberg Traurig, LLP

(57) ABSTRACT

A video captured by an A/V recording and communication device may be stored for a longer period than normal when it is determined that the video contains evidence of a crime. Such a determination may be made, for example, based on an emergency call placed by a user responsive to the video, or based on applying an image analysis algorithm to the video.

20 Claims, 14 Drawing Sheets

AUTOMATIC ALTERATION OF THE STORAGE DURATION OF A VIDEO

CROSS-REFERENCE TO RELATED APPLICATION

This application claims the benefit of priority to U.S. provisional application No. 62/577,401, filed on Oct. 26, 2017, the entire contents of which are hereby incorporated by reference.

FIELD OF THE DISCLOSURE

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of automatic alteration of the storage duration of a video containing evidence of a crime for audio/video (A/V) recording and communication devices now will be discussed in detail with an emphasis on highlighting the advantageous features. These embodiments depict novel and non-obvious methods for storing video data for longer than the storage duration associated with a video storage policy and for retrieving video data after that video data would have been deleted under a video storage policy. The accompanying drawings, which are for illustrative purposes only, include the following figures, in which like numerals indicate like parts.

DETAILED DESCRIPTION

The following detailed description describes the present embodiments with reference to the drawings. Example methods, apparatuses, and systems described herein are not intended to limit the scope of the description to the precise form or forms detailed herein. Instead the following description is intended to be illustrative so that others may follow its teachings.

Known video monitoring systems, particularly home security video monitoring systems, generally have a video image storage policy that includes one or more storage durations for storing video data captured by the system. A given storage duration may be a set period of time determined by, for example, a data storage capacity associated with the system, a user's subscription level, a video quality captured by the system, and the like. Generally, when the storage duration associated with a given video expires, the video is deleted.

Some video monitoring systems enable a user to extend the storage of a video beyond the storage duration originally associated with that video in certain circumstances. For example, a user may download a local copy of a given video or tag a video for permanent storage. Such capabilities, however, generally require affirmative action from the user and do not result in video associated with criminal activity to be automatically stored. As a result, evidence of criminal activity may be lost.

The present disclosure includes methods for automatically storing video data captured by an A/V recording and communication device, responsive to a determination that the video data may include evidence of a crime, for a longer period of time than the storage duration that would otherwise be associated with that video data under the video storage policy associated with the A/V recording and communication device. Such a determination may be based on, for example, an emergency call placed by a user associated with the A/V recording and communication device, algorithmic analysis of the video data, and the like. As a result, a user may be able to access a video from a client device after the video would have otherwise been deleted under the video storage policy. Before proceeding to a description of example methods of storing and retrieving video beyond the storage duration of a video storage policy with reference to FIGS. 6A-9, a description of example hardware and software with which the methods of the instant disclosure may find use will first be described with reference to FIGS. 1-5C.

Figure 1:
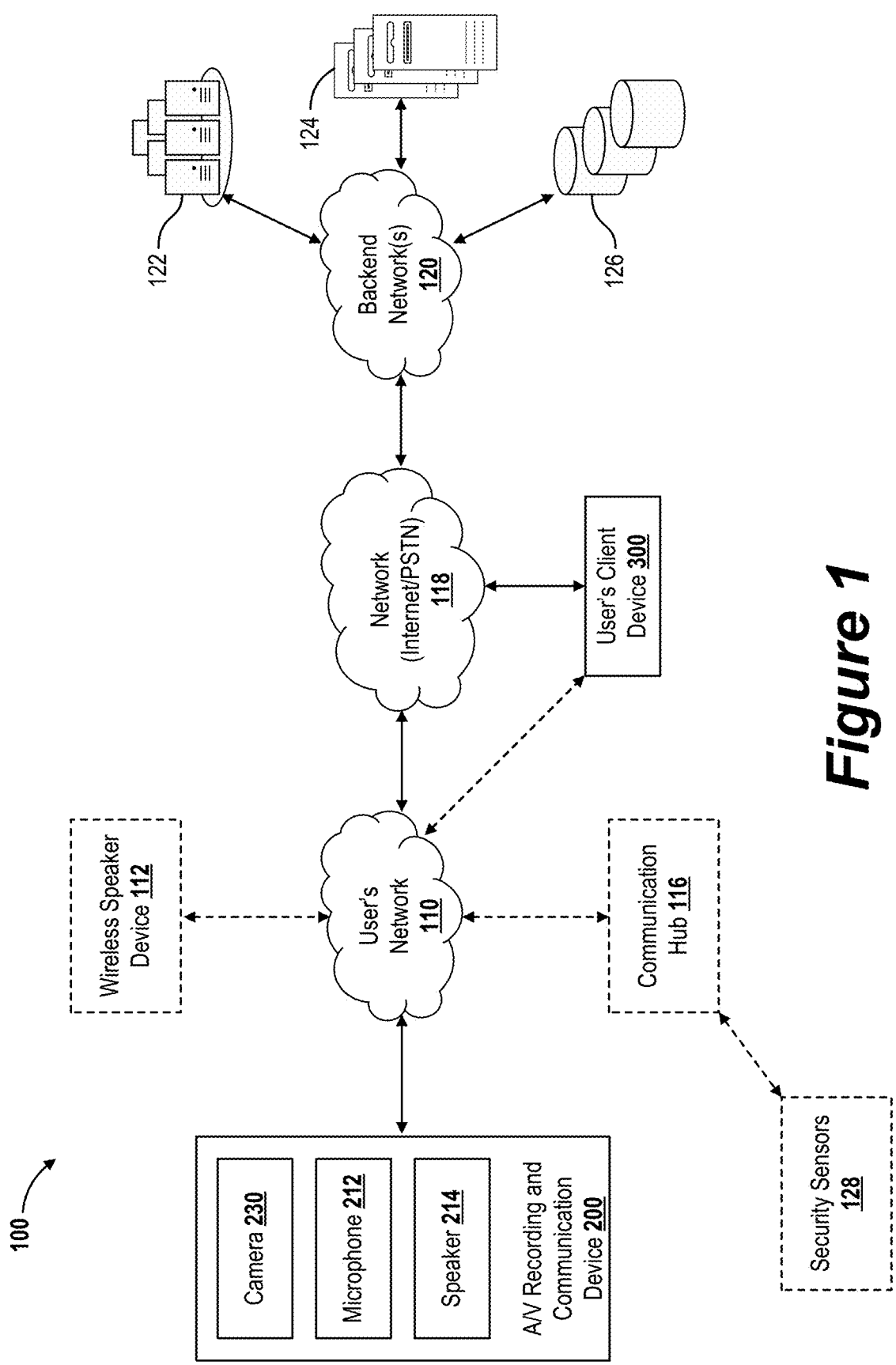
FIG. 1 is a functional block diagram illustrating a system for streaming and storing A/V content captured by an audio/video (A/V) recording and communication device according to various aspects of the present disclosure.

FIG. 1 discloses an example system 100 of the present disclosure. The system includes an audio/video (A/V) recording and communication device 200, which includes a camera 230, a speaker 212, and a microphone 214, among other components. An example A/V recording and communication device is shown and described in more detail with respect to FIG. 2.

While the present disclosure provides numerous examples of methods and systems including A/V recording and communication doorbells, the present embodiments are equally applicable for A/V recording and communication devices 200 other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. An example A/V recording and communication security camera may further omit other components. In another example, the present embodiments may include one or more A/V recording and communication floodlight controllers instead of, or in addition to, one or more A/V recording and communication doorbells.

The A/V recording and communication device 200 may be located near the entrance to a structure (not shown), such as a dwelling, a business, a storage facility, etc. The A/V recording and communication device 200 includes a camera 230, a speaker 212, and a microphone 214. The camera 230 may comprise, for example, a high definition (HD) video camera, such as one capable of capturing video images at an image display resolution of 720p, 1080p, 2120p, or any other image display resolution. While not shown, the A/V recording and communication device 200 may also include other hardware and/or components, such as a housing, a communication module (which may facilitate wired and/or wireless communication with other devices), one or more motion sensors (and/or other types of sensors), a button, etc. The A/V recording and communication device 200 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth herein.

With further reference to FIG. 1, the A/V recording and communication device 200 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 may be connected to another network 118, which may comprise, for example, the Internet and/or a public switched telephone network (PSTN). As described below, the A/V recording and communication device 200 may communicate with the user's client device 300 via the user's network 110 and, optionally, the network 118 (Internet/PSTN). The user's client device 300 may comprise, for example, a mobile telephone (which may also be referred to as a cellular telephone), such as a smartphone, a personal digital assistant (PDA), or another communication device. The user's client device 300 comprises a display (not shown) and related components capable of displaying streaming and/or recorded video images. The user's client device 300 may also comprise a speaker and related components capable of broadcasting streaming and/or recorded audio, and may also comprise a microphone.

The A/V recording and communication device 200 may also communicate, via the user's network 110 and the network 118 (Internet/PSTN), with a backend network(s) 120 of servers and/or backend devices, such as (but not limited to) one or more remote storage devices 126 (which may be referred to interchangeably as "cloud storage device(s)"), one or more backend servers 124, and one or more backend APIs 122. While FIG. 1 illustrates the storage device 126, the server 124, and the backend API 122 as components separate from the network 120, it is to be understood that the storage device 126, the server 124, and/or the backend API 122 may be considered to be components of the network 120, in an embodiment.

The network 118 may be any wireless network or any wired network, or a combination thereof, configured to operatively couple the above-mentioned modules, devices, and systems as shown in FIG. 1. For example, the network 118 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (who may be referred to interchangeably as "visitor," "intruder," "burglar," or other terms) arrives at the A/V recording and communication device 200, the A/V recording and communication device 200 detects the visitor's presence and begins capturing video images within a field of view of the camera 230. The A/V communication device 200 may also capture audio through the microphone 214. The A/V recording and communication device 200 may detect the visitor's presence by detecting motion using the camera 230 and/or a motion sensor (e.g., one or more passive infrared sensors (PIRs) or any other type of motion sensor), and/or by detecting that the visitor has pressed a front button of the A/V recording and communication device 200 (if, e.g., the A/V recording and communication device 200 is a doorbell).

In response to the detection of the visitor, the A/V recording and communication device 200 may send an alert to the user's client device 300 (FIG. 1) via the user's network 110 and the network 118. The A/V recording and communication device 200 also sends streaming video, and may also send streaming audio, to the user's client device 300. If the user answers the alert, two-way audio communication may then occur between the visitor and the user through the A/V recording and communication device 200 and the user's client device 300. The user may view the visitor throughout the duration of the call, but the visitor cannot see the user (unless the A/V recording and communication device 200 includes a display, which it may in some embodiments).

The video images captured by the camera 230 of the A/V recording and communication device 200 (and the audio captured by the microphone 214) may be uploaded to the cloud and recorded on the remote storage device 126 (FIG. 1). In some embodiments, the video and/or audio may be recorded on the remote storage device 126 even if the user chooses to ignore the alert sent to the client device 300.

With further reference to FIG. 1, the system 100 may further comprise a backend API 122 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicates with one another using their public APIs. In some embodiments, the API backend may hold the bulk of the user data and offer the user management capabilities, leaving the clients to have very limited state.

The backend API 122 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

In some embodiments, the system 100 of FIG. 1 also includes a wireless speaker device 112. The wireless speaker device 112 may be capable of communicating over one or more networks. When connected to the user's network 110, the wireless speaker device 112 may serve to produce an audible sound responsive to the A/V recording and communication device 200 receiving an input (e.g., a visitor pressing the doorbell button on the A/V recording and communication device 200).

The wireless speaker device 112 may connect to the user's network 110 via Wi-Fi, in one aspect of the present disclosure. The wireless speaker device 112 may also communicate directly with, and communicate with other devices via, a communication hub 116. Other communication protocols and/or standards may also be used. The wireless speaker device 112 may be a stand-alone product or component capable of emitting an audible sound, amongst other functions, to a user within audible range of the wireless speaker device 112.

In an example operation, a user pressing a button on the A/V recording and communication device 200 causes the transmission of a message or signal to a computing device over a network. That computing device may then echo that message, or transmit a different message, to the wireless speaker device 112. That message may, among other things, include instructions that cause the wireless speaker device to produce one or more audible sounds. Other example wireless speaker devices may be described in greater detail below.

In some embodiments, the system 100 further includes communicatively coupled thereto the communication hub 116. The communication hub 116 may be capable of communicating directly (e.g., via Wi-Fi Direct, Bluetooth, Zigbee, etc.), and/or via the user's network 110, with the A/V recording and communication device 200, the client device 300, the wireless speaker 112, other devices present within the user's home, and/or other devices across the Internet network 118.

In some implementations, the communication hub 116 is a "smart" hub capable of facilitating communication among two or more devices across a network. For example, the communication hub 116 may relay information between the A/V recording and communication device 200 and the user's client device 300, to facilitate bidirectional audio transmissions therebetween (e.g., establishing two-way audio communication between a visitor at the A/V recording and communication device 200 and the user's client device 300) without the need of a backend server device.

The communication hub 116 may also provide device internetworking functionality, allowing one device to communicate to another device without a separate backend server or computing device. For instance, two A/V recording and communication devices 200 (e.g., one at the front door and one at the back door of a user's home) may communicate to one another through the communication hub 116. One A/V recording and communication device 200 may, upon experiencing a triggering event, broadcast a message to other A/V recording and communication devices 200 in the user's network 110, instructing those devices to carry out some action. In this manner, device-to-device cooperation may be achieved, without requiring backend server interaction (although, backend server communication may also occur).

In an embodiment, the A/V recording and communication device 200 and communication hub 116 may be provided as part of a broader home or premises security system. In such an embodiment, the system 100 may further include one or more security sensors 128. The security sensors 128 may include, for example, door open sensors, motion sensors, glass break sensors, and the like. In such an embodiment, the communication hub 116 may further act as a control system for the security sensors 128 and may activate and deactivate the security sensors 128, may send alerts to the user client device 300 responsive to data from the security sensors 128 (e.g., data indicative of an intrusion), may output alerts to a monitoring service or monitoring center (not shown) responsive to data from the security sensors 128, and/or may trigger an audible or other alarm (e.g., on the wireless speaker device 112) responsive to data from the security sensors 128. In an embodiment, the communication hub 116 may be configured to alter a state of the security system. For example, the communication hub may be configured to alter the state of the security system from an unarmed state, in which data from the security sensors 128, such as data indicative of a door or window being opened, is not indicative of an intrusion, to an armed state, in which data from one or more of the security sensors 128 is indicative of an intrusion.

Figure 2:
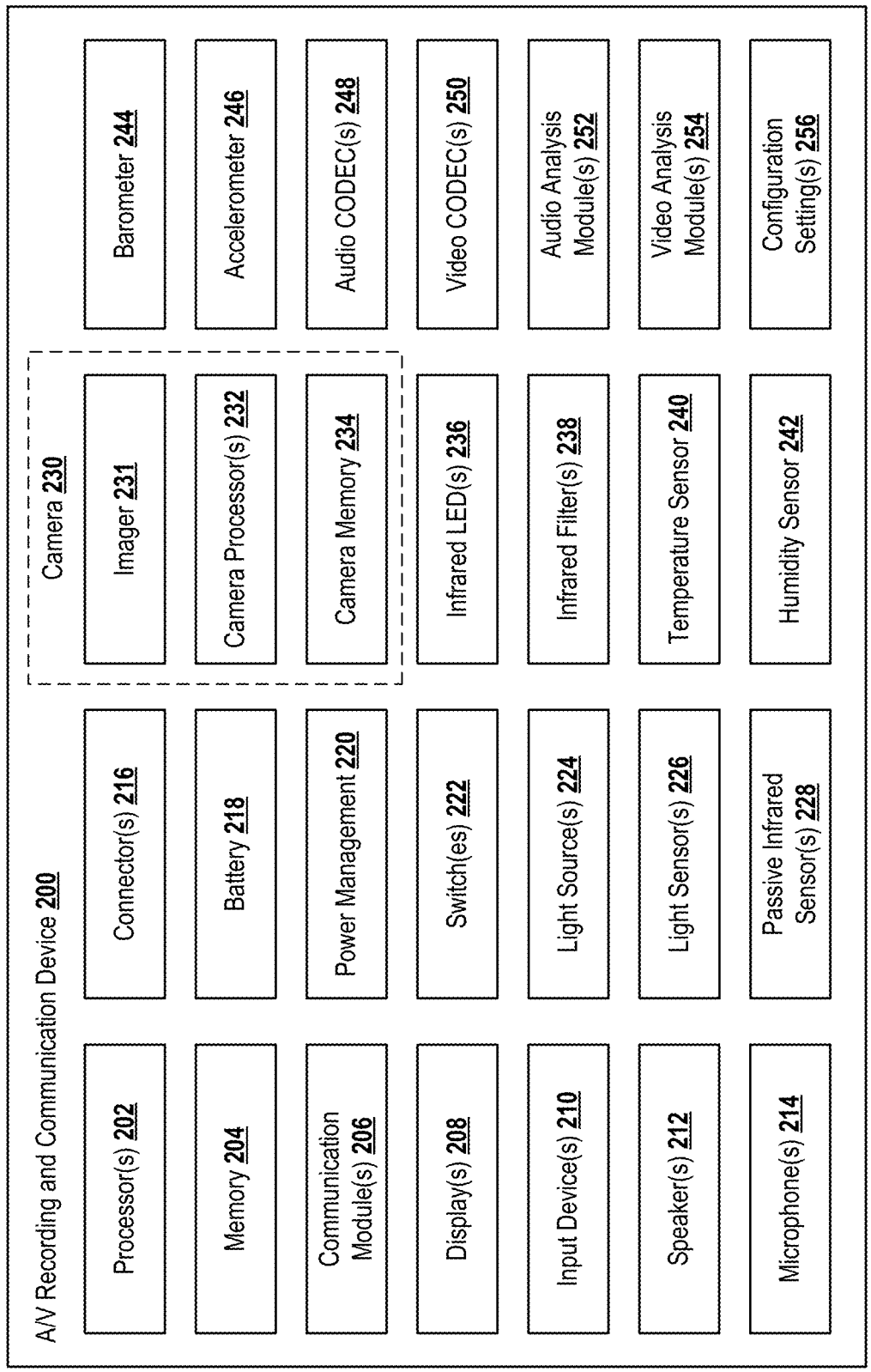
FIG. 2 is a functional block diagram of the components of the A/V recording and communication device of FIG. 1.

FIG. 2 is a functional block diagram of the components within or in communication with, an example audio/video (A/V) recording and communication device 200, according to an aspect of the present embodiments. The A/V recording and communication device 200 may include an accelerometer 246, a barometer 244, a humidity sensor 242, and a temperature sensor 240, which may collectively be embodied in a bracket printed circuit board (PCB), in an embodiment. The accelerometer 246 may be one or more sensors capable of sensing motion and/or acceleration. The barometer 244 may be one or more sensors capable of determining the atmospheric pressure of the surrounding environment in which the bracket PCB may be located. The humidity sensor 242 may be one or more sensors capable of determining the amount of moisture present in the atmospheric environment in which the bracket PCB may be located. The temperature sensor 240 may be one or more sensors capable of determining the temperature of the ambient environment in which the A/V recording and communication device may be located. In an embodiment, the bracket PCB or other implementation of the accelerometer 246, a barometer 244, a humidity sensor 242, and/or temperature sensor 240 may be located outside the housing of the doorbell 200 so as to reduce interference from heat, pressure, moisture, and/or other stimuli generated by the internal components of the A/V recording and communication device 200.

The A/V recording and communication device may also include a light sensor(s) 226, one or more light sources 224, such as LEDs, one or more speaker(s) 212, and a microphone(s) 214, one or more of which may be implemented on a front PCB, in an embodiment. The light sensor(s) 226 may be one or more sensors capable of detecting the level of ambient light of the surrounding environment in which the A/V recording and communication device 200 may be located. The speaker(s) 212 may be any electromechanical device capable of producing sound in response to an electrical signal input. The microphone(s) 214 may include an acoustic-to-electric transducer or sensor capable of converting sound waves into an electrical signal.

The speaker(s) 212 and the microphone(s) 214 may be coupled to the camera processor 232 through one or more audio CODEC(s) 248. For example, the transfer of digital audio from the user's client device 300 and the speaker(s) 212 and the microphone(s) 214 may be compressed and decompressed using the audio CODEC(s) 248, coupled to the camera processor 232. Once compressed by the audio CODEC(s) 248, digital audio data may be sent through a communication module 206 to the network 118, routed by the one or more servers 124, and delivered to the user's client device 300. When the user speaks, after being transferred through the network 118, digital audio data is decompressed by the audio CODEC(s) 248 and emitted to the visitor via the speaker(s) 212.

The A/V recording and communication device 200 may further include one or more video CODEC(s) 250 and/or software instructions to leverage video CODEC(s) 250 for the purposes of compression and/or decompression of images and/or videos. In an example operation, the imager 231 captures light from a scene, which is then interpreted and processed by one or more camera processors 232 to convert captured light signals into raw image/video data. The camera processor(s) 232 and/or processor(s) 202 may then compress that raw image/video data using the one or more video CODEC(s) 250, to reduce the amount of data stored or transmitted by the A/V recording and communication device 200. Any combination of known video CODECs may be included within the video CODEC(s) 250. In some embodiments, the video CODEC(s) 250 alternatively or additionally includes special purpose or proprietary video CODEC(s).

With further reference to FIG. 2, the A/V recording and communication device may further include a power management module 220, a processor(s) 202 (which may also be referred to as "microcontroller," "CPU," or "controller"), the communication module 206, and memory 204, one or more of which may be implemented on a main PCB or power PCB, in an embodiment. In certain embodiments, the power management module 220 may comprise an integrated circuit capable of arbitrating between multiple voltage rails, thereby selecting a source of power for the A/V recording and communication device 200. The battery 218 and/or the connector(s) 216 may each provide power to the power management module 220. The power management module 220 may have separate power rails dedicated to the battery 218, the spring contacts, and the connector(s) 216. The power management module 220 may also serve as a conduit for data between the connector(s) 216 and the processor(s) 202.

The connector(s) 216 may be electrically coupled with an AC/DC adapter, in some embodiments. The A/V recording and communication device 200 may thus be configured to connected to a source of external AC (alternating-current) power, such as a household AC power supply (which may also be referred to as AC mains). The AC power supply may provide a voltage in the range of 110-220 VAC, for example. The incoming AC power may be received at the connector(s) 216 from an AC/DC adapter, which may convert the incoming AC power to DC (direct-current) and may step down the voltage from 110-220 VAC to a lower output voltage of about 12 VDC and an output current of about 2 A, for example. In various embodiments, the output of an AC/DC adapter may be in a range of from about 9V to about 15V, for example, and in a range of from about 0.5 A to about 5 A, for example. These voltages and currents are only examples provided for illustration and are not limiting in any way.

With further reference to FIG. 2, in certain embodiments the processor(s) 202 may comprise an integrated circuit including a processor core, memory, and programmable input/output peripherals. The processor(s) 202 may receive input signals, such as data and/or power, from the passive infrared sensor(s) 228 (or any other type of motion sensor(s)), the bracket PCB, the power management module 220, the light sensor(s) 226, the microphone(s) 214, and/or the communication module 206, and may perform various functions as further described below. When the processor(s) 202 is triggered by the passive infrared sensor(s) 228, the processor(s) 202 may be triggered to perform one or more functions. When the light sensor(s) 226 detects a low level of ambient light, the light sensor(s) 226 may trigger the processor(s) 202 to enable "night vision," as further described below. The processor(s) 202 may also act as a conduit for data communicated between various components and the communication module 206.

The display(s) 208 may be any electronic video display, such as a liquid-crystal display (LCD). The display(s) 208 may permit the A/V recording and communication device 200 to show information to visitors, output status information of the A/V recording and communication device 200 for users, and/or otherwise serve to communicate information to people (e.g., display a message to a hearing-impaired visitor). In some implementations, the display(s) 208 include embedded therein a digitizer, capacitive layer, or a resistive layer that allows the display(s) 208 to act as a touchscreen.

The input device(s) 210 may be any kind of human interface device (HID) that receives input from a user and translates that input into computer-understandable information. Some example input units include a keyboard, a mouse, a touchpad, and/or a touchscreen, among other possible input devices. In some instances, the input device(s) 210 may refer to an on-screen keyboard or pointer device of a touchscreen. A user may interact with input device(s) 210 to enter a text input, and/or press a button (physical or virtual), which may trigger execution of a command. Regardless of the kind of input device used, the input device(s) 210 may provide an interface through which a user can interact with A/V recording and communication devices of the present application.

For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 230 to see primarily infrared light as opposed to visible light. When the light sensor(s) 226 detects a low level of ambient light (which may comprise a level that impedes the performance of the imager 230 in the visible spectrum), the infrared LED(s) 236 may shine infrared light through the A/V recording and communication device 200 enclosure out to the environment, and the infrared filter(s) 238 may enable the imager 230 to see this infrared light as it is reflected or refracted off of objects within the field of view of the A/V recording and communication device 200. This process may provide the A/V recording and communication device 200 with the "night vision" function mentioned above.

With further reference to FIG. 2, the communication module 206 may comprise an integrated circuit including processor core(s), memory, and programmable input/output peripherals. The communication module 206 may also be configured to transmit data wirelessly to a remote network device, and may include one or more transceivers (not shown). The communication module 206 may enable wired and/or wireless communication through one or more wired and/or wireless networks, such as, without limitation, Ethernet, Wi-Fi, cellular, Bluetooth, and/or satellite networks. The communication module 206 may receive inputs, such as power and/or data, from the camera PCB, the processor(s) 202, input device(s) 210 including buttons, and/or the power PCB memory 204. When one or more buttons are pressed, the communication module 206 may be triggered to perform one or more functions. When the reset button is pressed, the communication module 206 may be triggered to erase any data stored at the power PCB memory 204 and/or at the camera memory 234. The communication module 206 may also act as a conduit for data communicated between various components and the processor(s) 202. The power PCB memory 204 may comprise flash memory configured to store and/or transmit data. For example, in certain embodiments the power PCB memory 204 may comprise serial peripheral interface (SPI) flash memory.

In some embodiments, the A/V recording and communication device 200 includes switch(es) 222, which can selectively couple and decouple two or more electric terminals. For instance, switch(es) 222 may include a switch—controlled by processor(s) 202 or another component of the A/V recording and communication device 200—that serves to couple and decouple a light source with a power source. As a specific example, switch(es) 222 may include a relay that, when activated, energizes a flood light. Switch(es) 222 may include relays, transistors, manual switches, and/or some combination thereof.

Light source(s) 224 may include any type of light bulb, light emitting diode (LED), LASER, or other light source of any wavelength or combination of wavelengths. In some embodiments, light source(s) 224 includes infrared LEDs to provide non-human-detectable illumination of a scene, enabling a "night vision" function of the A/V recording and communication device 200. Other light source(s) 224 may provide information to a user or visitor (e.g., indicators for charging, recording, etc.). Some light source(s) 224 may serve as an alert or visual siren (e.g., alternating flashing LEDs). Any combination of light sources may be included within light source(s) 224 without departing from the scope of the present application.

The A/V recording and communication device 200 may include functionality for the local processing of information, without the need of a server or backend computing device. In some embodiments, the A/V recording and communication device 200 includes audio analysis module(s) 252, video analysis module(s) 254, and configuration settings 256, among other special purpose software units. Each of these modules may be stored as instructions and/or data on a memory device of the A/V recording and communication device 204, such as memory 204, EEPROMs, and/or other non-volatile memory thereon. The specific configuration and software used to instantiate these modules may be modifiable and updateable (e.g., may be updated from a remote computing device over a network).

The audio analysis module(s) 252 may be operable to analyze audio signals or digital audio data to extract or quantify qualities of those audio signals or digital audio data. In some cases, the audio analysis module(s) 252 might include analog electrical analysis prior to digitizing audio signals. As one example, audio analysis module(s) 252 may include analog filters (e.g., low-pass filters, high-pass filters, band-pass filters, etc.), which can isolate a particular range of frequencies within an audio signal prior to being digitized. Such analog filters may reduce latency and/or computational complexity required to perform spectral analysis.

The audio analysis module(s) 252 may also include one or more digital analysis modules. Such modules—which might use known audio analysis techniques and/or proprietary techniques described in greater detail herein—may conduct spectral analyses, statistical analyses (e.g., amount of randomness), or amplitude determinations (e.g., relative volume of a sound), among other analyses. Higher level functions may also be implemented within audio analysis module(s) 252. For instance, the audio analysis module(s) 252 may carry out pattern detection, pattern matching, speech detection, speaker identification, and/or other proprietary sound detection, which may be described in greater detail below.

The video analysis module(s) 254 may be configured to analyze images and/or video data to identify the contents of images/video, classify portions of images/videos with some label, and/or otherwise derive information from images and/or video for subsequent use thereof. For example, a particular triggering event (e.g., sounding an alarm) may occur based on the detection of a particular object within an image or video feed. Video analysis module(s) 254 provide image and video analysis tools that enable the A/V recording and communication device to perform local processing of captured images without the need for backend processing. Such "onboard" video processing may be preferred over backend processing in circumstances where transmission latency over a wide area network would substantially reduce the efficacy of a particular method. The video analysis module(s) 254 may generally perform "computer vision" operations, including known techniques and/or novel techniques as described herein.

In some cases, the audio analysis module(s) 252 and the video analysis module(s) 254 may include software libraries, circuits, CODECs, classifiers, filters, machine learning tools, and/or other modules that are commonly used in audio and/or video processing. In other cases, the audio analysis module(s) 252 and/or video analysis module(s) 254 are proprietary software and/or hardware modules that carry out application-specific audio/video analyses. For example, a particular module may be a classifier that determines whether a video frame represents a daytime scene or a nighttime scene. Such specific audio/video classifiers, models, or modules may be described in greater detail below.

The audio analysis module(s) 252 and the video analysis module(s) 254 may further include modules for compressing audio and/or video data. For instance, an audio segment may be compressed by reducing the bitrate of that audio segment, thereby shrinking the amount of data representing that audio segment at the cost of audio quality. Likewise, a video clip may be compressed by reducing a video clip's resolution and/or its per-pixel bitrate (e.g., color depth). In other cases, a video clip might be compressed using "P-frame" or "delta-frame" techniques, in which only changes between successive video frames are encoded. Any type of audio/video compression techniques may be employed on the A/V recording and communication device 200 without departing from the scope of the present disclosure.

The A/V recording and communication device 200 may also thereon include configuration setting(s) 256. In some embodiments, the configuration setting(s) 256 represent the "state" of the A/V recording and communication device 200. For example, the A/V recording and communication device 200 may be placed into an "armed" mode when its owner is away from home. A configuration file, flag, or the like may be modified, which might affect some aspects of the A/V recording and communication device's 200 operation. For instance, an A/V recording and communication device 200 in "armed" mode may produce a siren sound in response to a triggering event, which would not otherwise occur if the A/V recording and communication device 200 was not in the "armed" mode.

The configuration setting(s) 256 may also represent a particular configuration, parameters, weightings, or other settings of a quantitative model, classifier, machine learning algorithm, or the like. As one example, a support vector machine (SVM) may be represented as a hyperplane that divides two regions of vector space into two respective classifications. The coefficients defining the hyperplane may be included within the configuration setting(s) 256. As another example, an artificial neural network (ANN) may comprise a set of interconnected nodes, with specific weights between each node connection. These connection weights may also be included within the configuration setting(s) 256.

The A/V recording and communication device 200 may carry out methods for detecting a particular audio event or a particular object within a video frame. In some implementations, the A/V recording and communication device 200 includes a classifier or machine learning algorithm that is executed locally on processor(s) 202. The parameters or weightings of the classifier or machine learning algorithm—that is, configuration setting(s) 256—may be updated (e.g., received from a computing device via the communication module(s) 206). Thus, the configuration setting(s) 256 may include parameters, coefficients, or weightings that enable or improve the audio analysis module(s) 252 and the video analysis module(s) 254 to carry out particular tasks, as may be described in greater detail herein.

In some cases, various embodiments of the processor(s) 202 and/or memory 204 may include thereon instructions that, upon execution, implement computer vision and/or image or video analysis functions. Alternatively, or additionally, the A/V recording and communication device 200 might include one or more integrated circuits in communication with the processor(s) 202 to carry out aspects of computer vision functions, such as object recognition, image or video compression, and/or face detection, among other functions.

As described herein, "computer vision" refers to methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication device 200 may include a computer vision module. The computer vision module may include any of the components (e.g. hardware) and/or functionality described herein with respect to computer vision, including, without limitation, one or more cameras, sensors, and/or processors. In some of the present embodiments, the microphone 246, the camera, and/or the imaging processor 240 may be components of the computer vision module.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; estimation of application-specific parameters, such as object pose or object size; image recognition—classifying a detected object into different categories; image registration—comparing and combining two different views of the same object.

Decision making—Making the final decision required for the application, for example match/no-match in recognition applications.

One or more of the present embodiments may include a vision processing unit (which may be a component of the computer vision module). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many-core DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches: geometric, which looks at distinguishing features; or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the video analysis module(s) 254, the imager 230, and/or the processor(s) 202 or 232 may receive information about the person using any one, or any combination of more than one, of the foregoing biometrics.

Additionally, or alternatively, the A/V recording and communication device 200 may also transmit captured audio/video to a computing device, such as a backend server, over a network for subsequent processing thereof. Such a backend server may, in some cases, conduct audio, image, and/or video analyses to determine the presence or absence of some object or event. If a detection is made, the backend server may then transmit messages to the A/V recording and communication device 200, a client device 300, and/or other devices. In some instances, transmitted audio/video may be stored in a storage device (e.g., in a database), to serve as training data for the purpose of generating and/or improving a classifier or machine learning tool.

With further reference to FIG. 2, the A/V recording and communication device 200 may comprise components that facilitate the operation of a camera. For example, an imager 230 may comprise a video recording sensor and/or a camera chip. In one aspect of the present disclosure, the imager 230 may comprise a complementary metal-oxide semiconductor (CMOS) array, and may be capable of recording high definition (e.g., 720p, 2120p, etc.) video files. A camera processor 232 may comprise an encoding and compression chip. In some embodiments, the camera processor 232 may comprise a bridge processor. The camera processor 232 may process video recorded by the imager 230 and audio recorded by the microphone(s) 214, and may transform this data into a form suitable for wireless transfer by the communication module 206 to a network. The camera memory 234 may comprise volatile memory that may be used when data is being buffered or encoded by the camera processor 232. For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 230 to see primarily infrared light as opposed to visible light. When the light sensor(s) 226 detects a low level of ambient light (which may comprise a level that impedes the performance of the imager 230 in the visible spectrum), the Infrared LED(s) 236 may shine infrared light through the A/V recording and communication device 200 enclosure out to the environment, and the Infrared filter(s) 238 may enable the imager 230 to see this infrared light as it is reflected or refracted off of objects within the field of view of the doorbell. This process may provide the AN recording and communication device 200 with the "night vision" function mentioned above.

Figure 3:
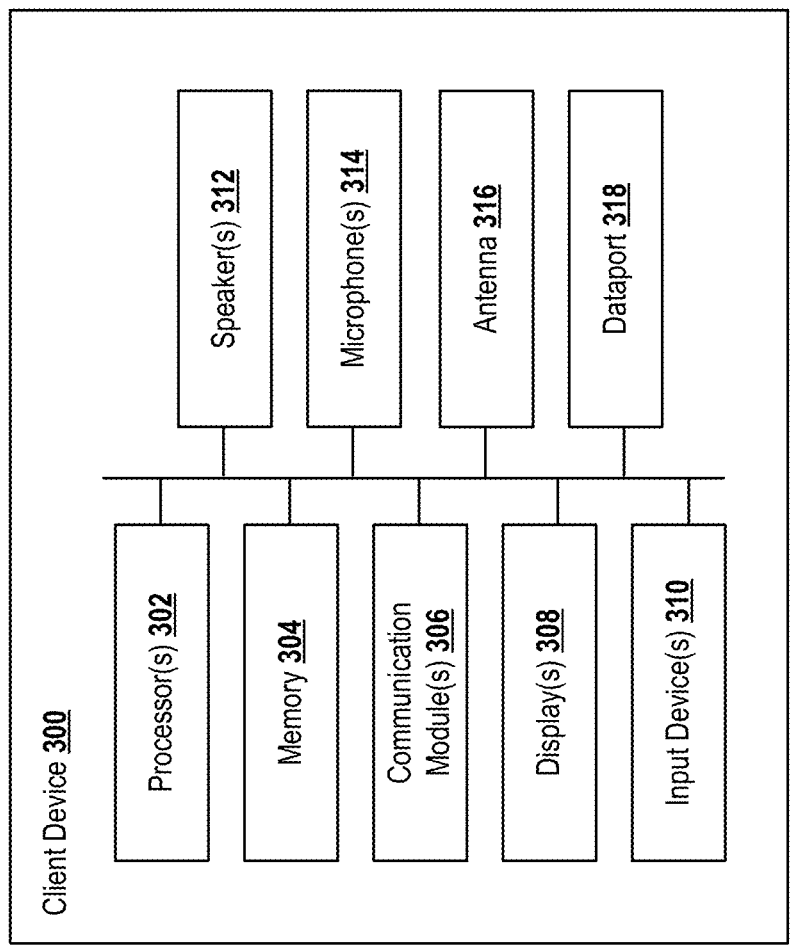
FIG. 3 is a functional block diagram of a client device on which the present embodiments may be implemented according to various aspects of the present disclosure.

FIG. 3 is a functional block diagram of an example client device 300 on which the present embodiments may be implemented according to various aspects of the present disclosure. The user's client device 300 described with reference to FIG. 1 may include some or all of the components and/or functionality of the client device 300 illustrated in FIG. 3. The client device 300 may comprise, for example, a smartphone.

With reference to FIG. 3, the example client device 300 includes a processor(s) 302, a memory 304, a display(s) 308, a communication module(s) 306, input device(s) 310, speaker(s) 312, microphone(s) 314, connector(s) 316, battery 318, and a dataport 318. These components are communicatively coupled together by an interconnect bus. The processor(s) 302 may include any processor used in smartphones and/or portable computing devices, such as an ARM processor (a processor based on the RISC (reduced instruction set computer) architecture developed by Advanced RISC Machines (ARM).). In some embodiments, the processor(s) 302 may include one or more other processors, such as one or more conventional microprocessors, and/or one or more supplementary co-processors, such as math co-processors.

The memory 304 may include both operating memory, such as random access memory (RAM), as well as data storage, such as read-only memory (ROM), hard drives, flash memory, or any other suitable memory/storage element. The memory 304 may include removable memory elements, such as a CompactFlash card, a MultiMediaCard (MMC), and/or a Secure Digital (SD) card. In some embodiments, the memory 304 may comprise a combination of magnetic, optical, and/or semiconductor memory, and may include, for example, RAM, ROM, flash drive, and/or a hard disk or drive. The processor(s) 302 and the memory 304 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor(s) 302 may be connected to the memory 304 via the dataport 318.

The display(s) 308 may include any user interface or presentation elements suitable for a smartphone and/or a portable computing device, such as a keypad, a display screen, a touchscreen, a microphone, and a speaker. The communication module(s) 306 is configured to handle communication links between the client device 300 and other, external devices or receivers, and to route incoming/outgoing data appropriately. For example, inbound data from the dataport 318 may be routed through the communication module(s) 306 before being directed to the processor(s) 302, and outbound data from the processor(s) 302 may be routed through the communication module(s) 306 before being directed to the dataport 318. The communication module(s) 306 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 318 may be any type of connector used for physically interfacing with a smartphone and/or a portable computing device, such as a mini-USB or USB-C port or an IPHONE®/IPOD® 30-pin connector or LIGHTNING® connector. In other embodiments, the dataport 318 may include multiple communication channels for simultaneous communication with, for example, other processors, servers, and/or client terminals.

The memory 304 may store instructions for communicating with other systems, such as a computer. The memory 304 may store, for example, a program (e.g., computer program code) adapted to direct the processor(s) 302 in accordance with the present embodiments. The instructions also may include program elements, such as an operating system. While execution of sequences of instructions in the program may cause the processor(s) 302 to perform the process steps, aspects, or portions described herein, hard-wired circuitry may be used in place of, or in combination with, software/firmware instructions for implementation of the processes of the present embodiments. Thus, the present embodiments are not limited to any specific combination of hardware and software.

The input device(s) 310 may include any combination of hardware and/or software elements that receive user input and/or facilitate the interpretation of received input. Input device(s) 310 may be hardware (e.g., physical buttons and switches), software (e.g., virtual buttons, sliders, etc.), or some combination thereof (e.g., software-controlled haptic feedback for simulating button clicks). In some instances, input device(s) 310 includes a touchscreen or touch-based digitizer. Input device(s) 310 may include a virtual keyboard or other virtual input elements as well.

The speaker(s) 312 may include any combination of speakers or other sound-emitting devices. The speaker(s) 312 may be operable to produce a variety of sounds, such as audio from live video, notification or alert sounds, or other audible sounds.

The microphone(s) 314 may include any combination of transducers that convert pressure waves into electrical signals. The microphone(s) 314 may capture audio, which may, in some instances, be transmitted to a separate computing device or server. That transmitted audio may then be relayed to an A/V recording and communication device 200 (e.g., to provide a substantially live audio transmission to a video doorbell).

The antenna 316 may enable the client device 300 to communicate wirelessly. For instance, the antenna 316 permits the client device 300 to communicate over cellular networks, via one or more communication standards (e.g., GSM, CDMA, LTE, etc.). The antenna 316 may allow the client device 300 to communicate over other wireless protocols, such as Wi-Fi or Bluetooth, among other wireless protocols. The antenna 316 may include multiple antennae, depending on the particular implementation.

In addition to the above, the client device 300 may include a variety of other components, such as batteries, connectors, light indicators, cameras, and sensors, among other components.

Figure 4:
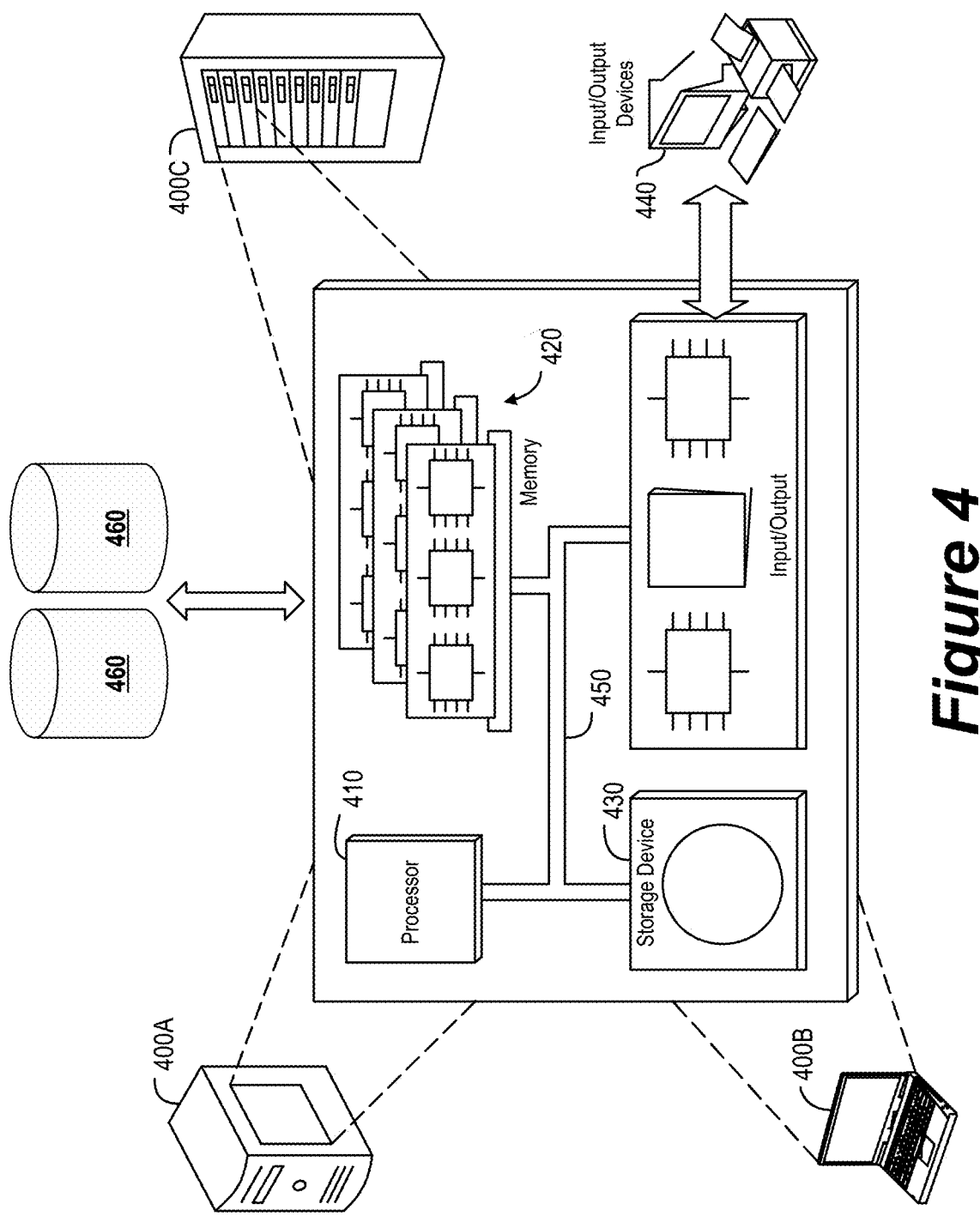
FIG. 4 is a functional block diagram of a general-purpose computing system on which the present embodiments may be implemented according to various aspects of present disclosure.

FIG. 4 is a functional block diagram of a general-purpose computing system on which the present embodiments may be implemented according to various aspects of the present disclosure. The computer system 400 may be embodied in at least one of a personal computer (also referred to as a desktop computer) 400A, a portable computer (also referred to as a laptop or notebook computer) 400B, and/or a server 400C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 400 may execute at least some of the operations described above. The computer system 400 may include at least one processor 410, memory 420, at least one storage device 430, and input/output (I/O) devices 440. Some or all of the components 410, 420, 430, 440 may be interconnected via a system bus 450. The processor 410 may be single- or multi-threaded and may have one or more cores. The processor 410 may execute instructions, such as those stored in the memory 420 and/or in the storage device 430. Information may be received and output using one or more I/O devices 440.

The memory 420 may store information, and may be a computer-readable medium, such as volatile or non-volatile memory. The storage device(s) 430 may provide storage for the system 400, and may be a computer-readable medium. In various aspects, the storage device(s) 430 may be a flash memory device, a hard disk device, an optical disk device, a tape device, or any other type of storage device.

The I/O devices 440 may provide input/output operations for the system 400. The I/O devices 440 may include a keyboard, a pointing device, and/or a microphone. The I/O devices 440 may further include a display unit for displaying graphical user interfaces, a speaker, and/or a printer. External data may be stored in one or more accessible external databases 460.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps, aspects, or portions may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 5A:
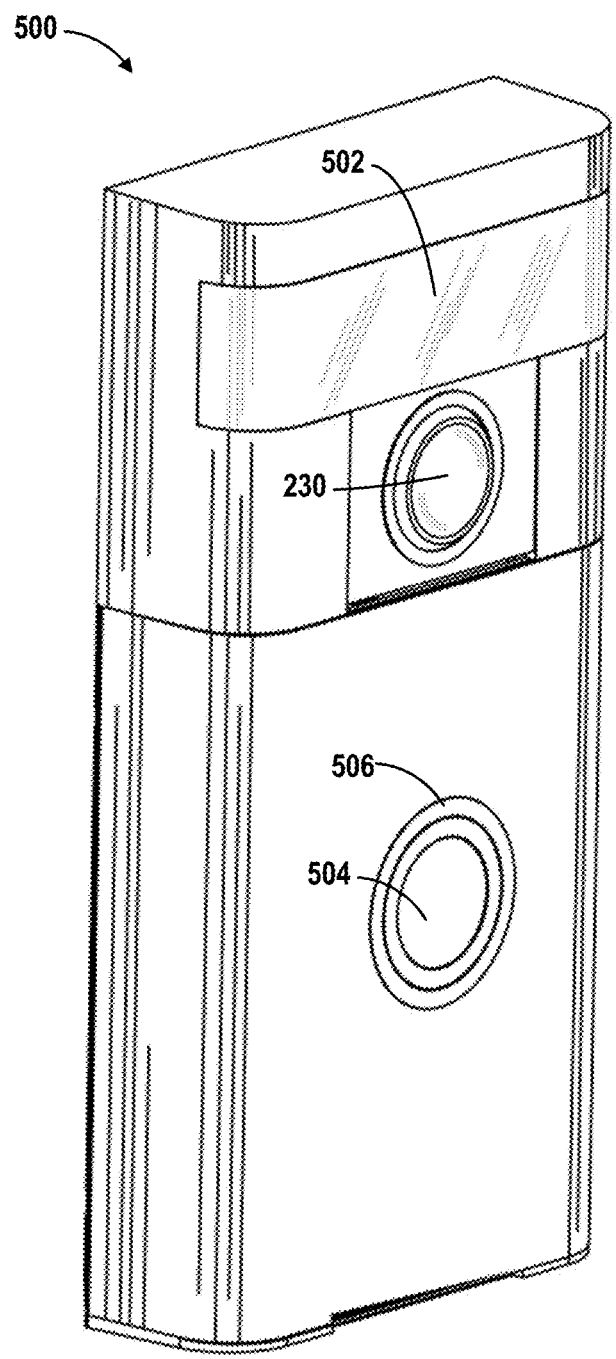
FIGS. 5A, 5B, and 5C depict example A/V recording and communication devices according to various aspects of present disclosure.
Figure 5B:
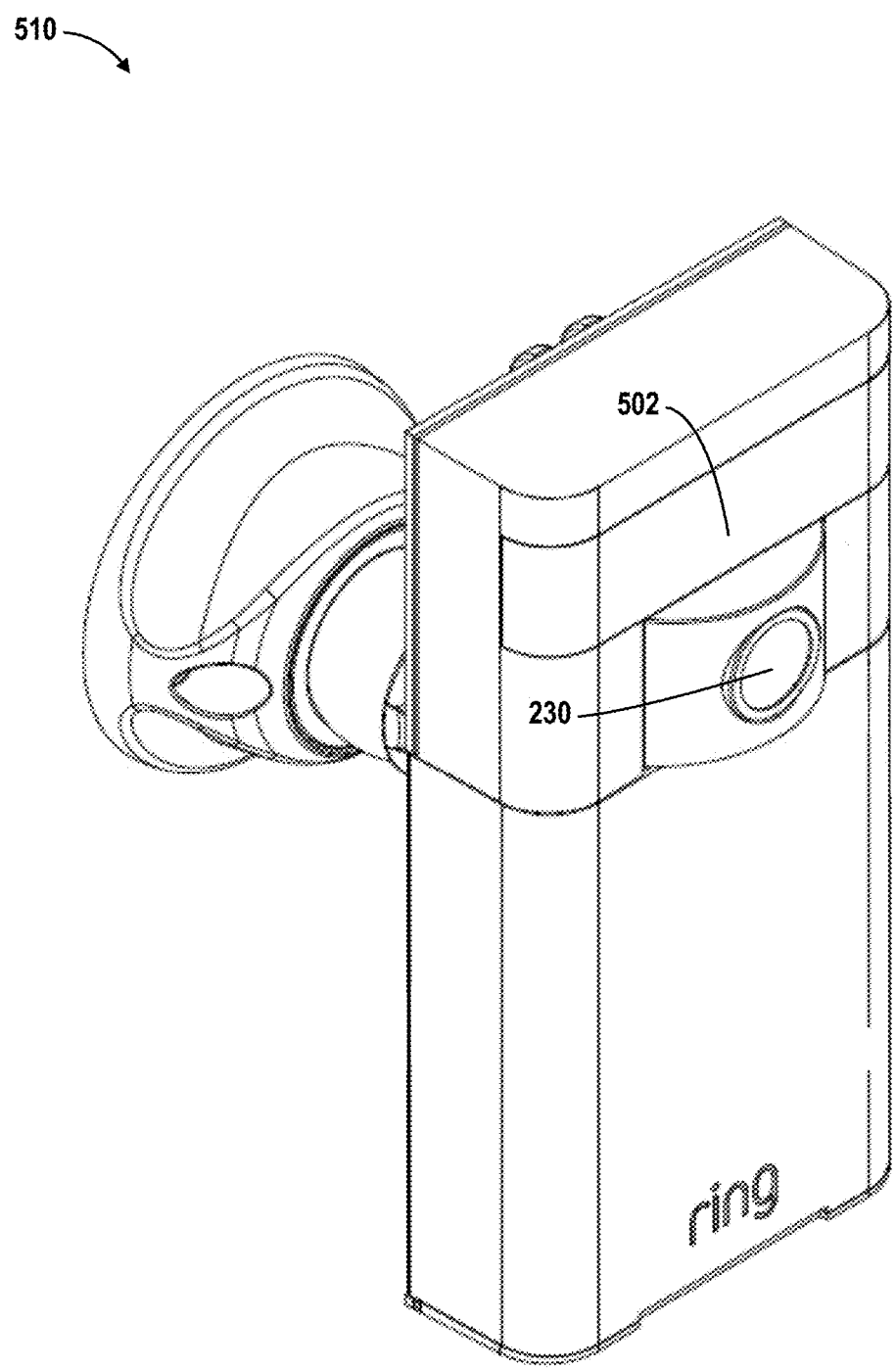
Figure 5C:
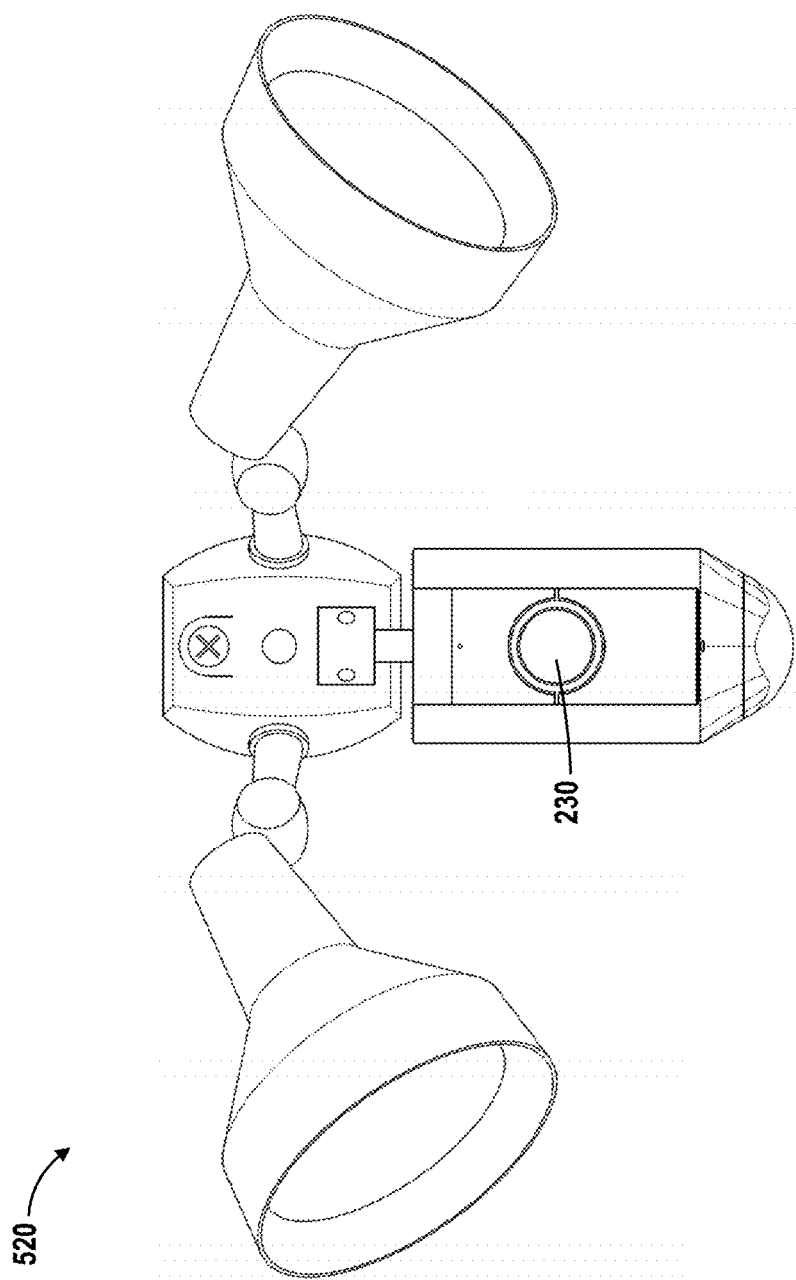

FIGS. 5A, 5B, and 5C depict example A/V recording and communication devices 500, 510, 520. The A/V recording and communication device 500 (FIG. 5A) may be referred to herein as a "video doorbell" or some variant thereof. The A/V recording and communication device 510 (FIG. 5B) may be referred to herein as a "security cam" or some variant thereof. The A/V recording and communication device 520 (FIG. 5C) may be referred to herein as the "floodlight cam," "spotlight cam," or some variant thereof. The A/V recording and communication devices 500, 510, 520 may be embodiments of the A/V recording and communication device 200 described with respect to FIG. 2, and thus may each include some or all of the elements of A/V recording and communication device 200. The A/V recording and communication devices 500, 510, 520 may also include additional hardware and/or software elements not explicitly contemplated in the present disclosure. Although FIGS. 5A-5C illustrate example A/V recording and communication device implementations, other form factors, shapes, mounting hardware, arrangement of components, or aesthetic aspects may be used without departing from the scope of the present disclosure.

Each of the video doorbell 500, the security cam 510, and the floodlight cam 520 may include a camera 230 that captures video data when activated. At least the video doorbell 500 and security cam 510 may further include a lens 502. In some embodiments, the lens 502 may comprise a Fresnel lens, which may be patterned to deflect incoming light into one or more infrared sensors located within the video doorbell 500 or the security cam 510 (e.g., the passive infrared sensors 226 (FIG. 2)).

The video doorbell 500 may further include a button 504 and a light pipe 506. The button 504 may make contact with a button actuator (not shown) located within the video doorbell 500 when the button 504 is pressed by a visitor. When pressed, the button 504 may trigger one or more functions of the doorbell 500, such as sounding an audible alert, transmitting a notification to a user, etc. The light pipe 506 may allow light produced within the doorbell 500 (e.g., by the light source(s) 224 (FIG. 2)) to pass through.

Figure 7:
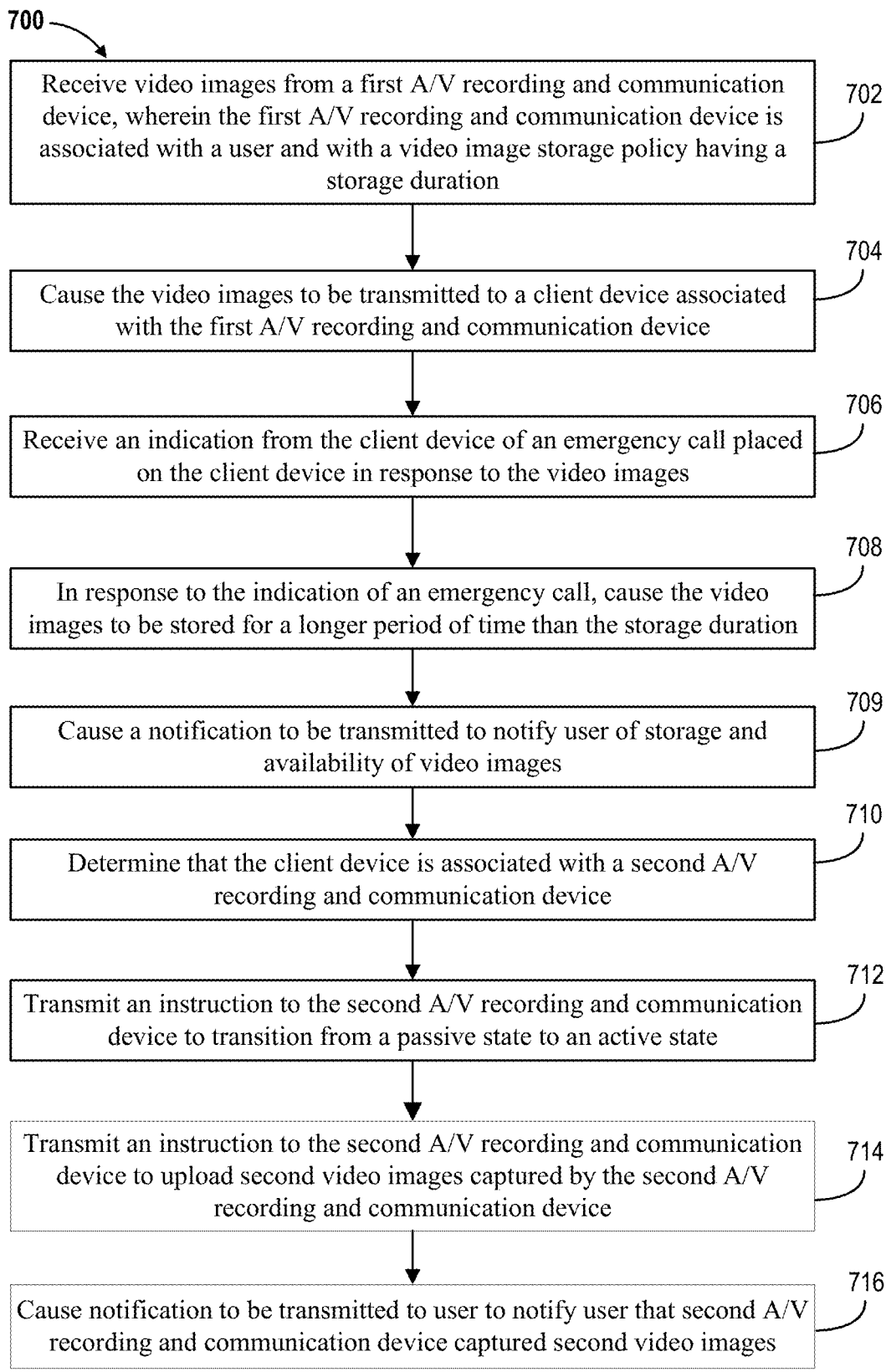
FIG. 7 is a flow chart illustrating an example method of storing video images captured by an A/V recording and communication device according to various aspects of present disclosure.
Figure 8:
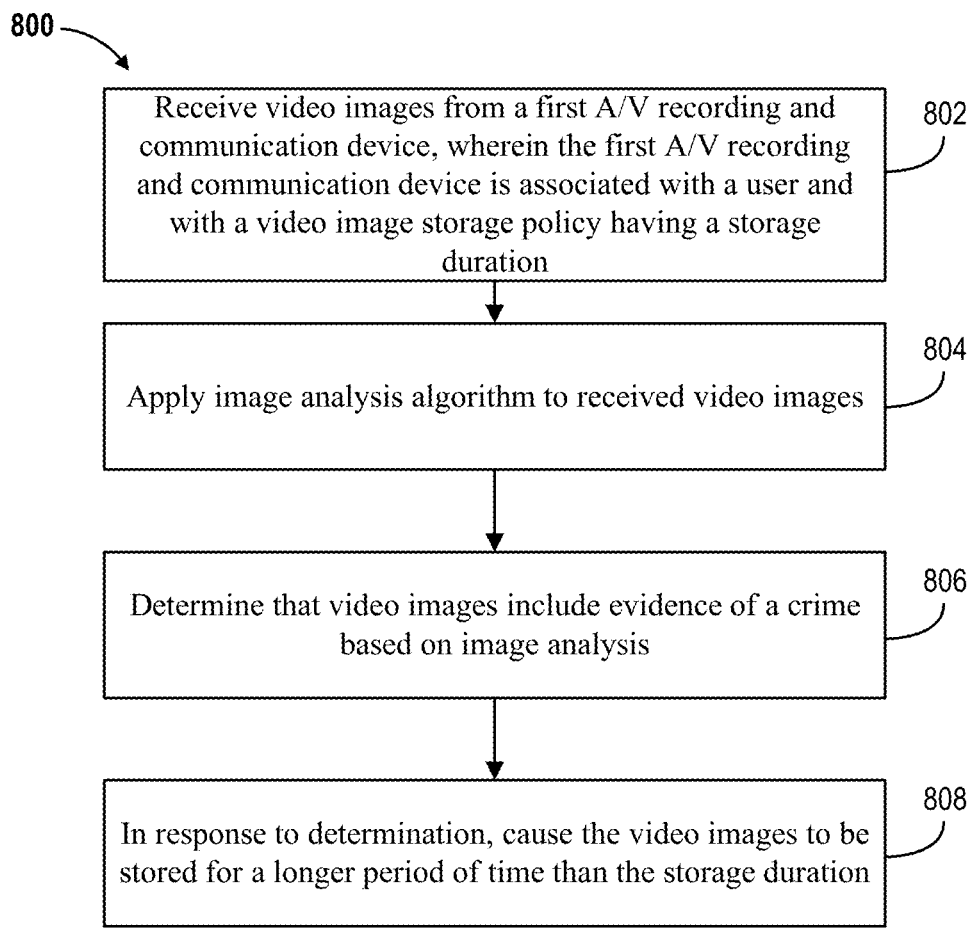
FIG. 8 is a flow chart illustrating an example method of storing video images captured by an A/V recording and communication device according to various aspects of present disclosure.
Figure 9:
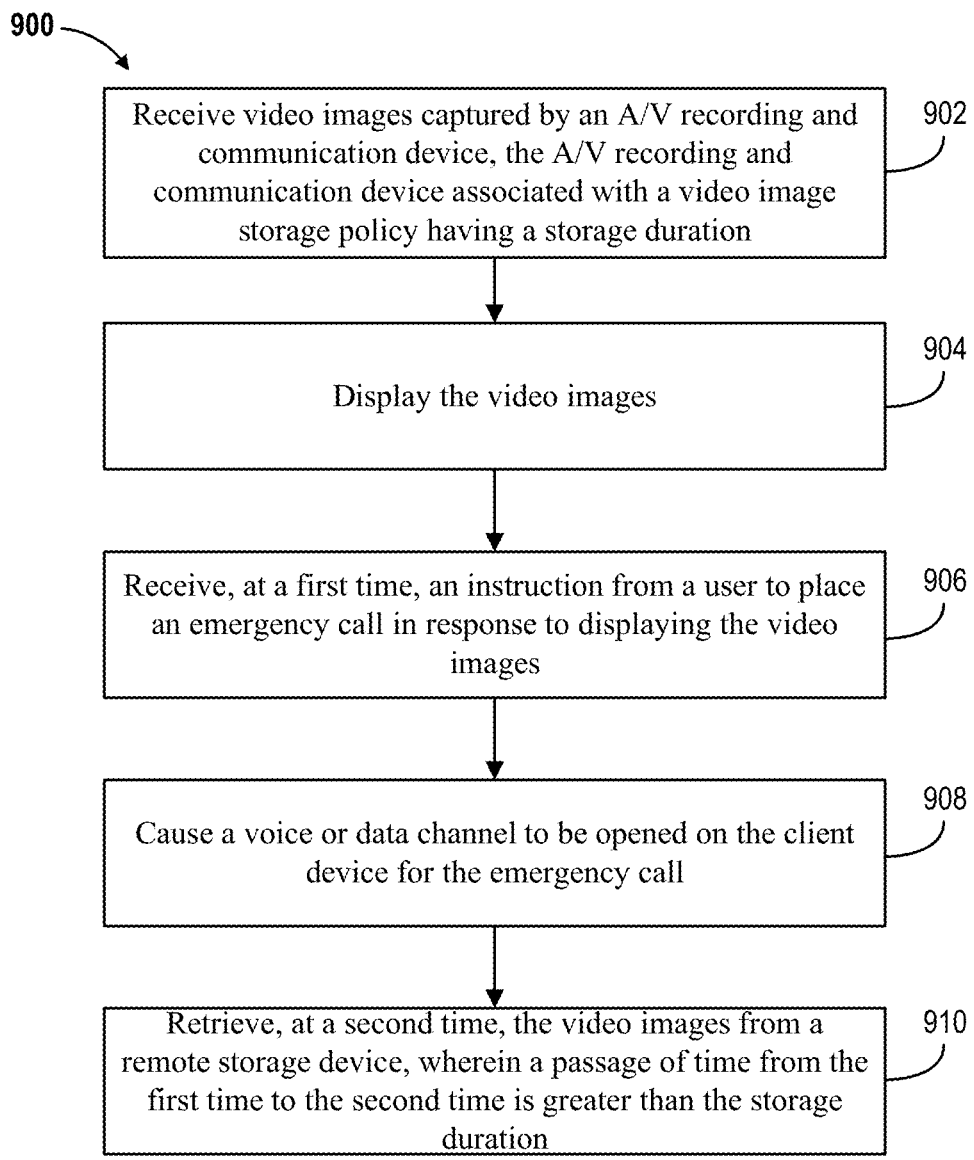
FIG. 9 is a flow chart illustrating an example method of retrieving stored video images that were captured by an A/V recording and communication device according to various aspects of present disclosure.

In various embodiments, one or more A/V recording and communication devices 200 may be installed at a location and may be associated with a single user or user account and may also be associated with a video storage policy. The video storage policy may include a storage duration that dictates the amount of time for which a video captured by the A/V recording and communication device 200 is stored (e.g., at a storage location in "the cloud") for access by the end user. An A/V recording and communication device 200 may be known to be associated with a particular user, user account, and/or user client device 300 based on a cross-listing stored in a back-end server or network (e.g. the backend API 122). FIGS. 7, 8, and 9 set forth example embodiments of methods for automatically storing video data beyond the duration of such a storage policy responsive to a user emergency phone call (FIG. 7), or responsive to video analysis indicating evidence of a crime (FIG. 8), and for retrieving video data after the expiration of the storage policy duration, where that video data is associated with an emergency phone call (FIG. 9). First, in conjunction with FIGS. 6A, 6B, and 6C, an example scenario will be described in which video storage beyond the storage duration of a storage policy may be desired.

Figure 6A:
FIGS. 6A, 6B, and 6C are example electronic user interface portions illustrating an example scenario in which it may be desirable to store video images captured by an A/V recording and communication device for longer than the duration dictated by a storage policy associated with the A/V recording and communication device according to various aspects of present disclosure.
Figure 6B:
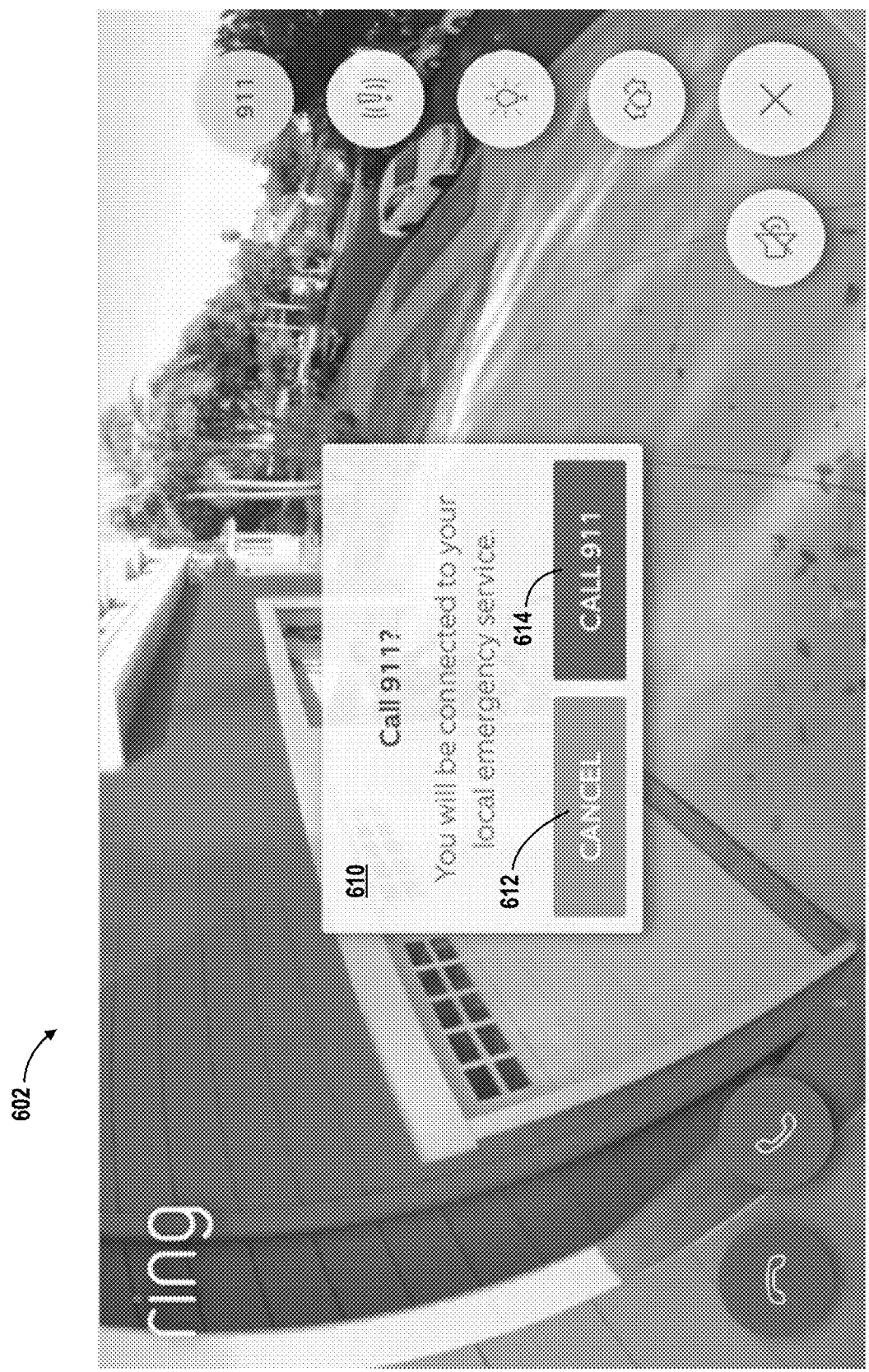
Figure 6C:
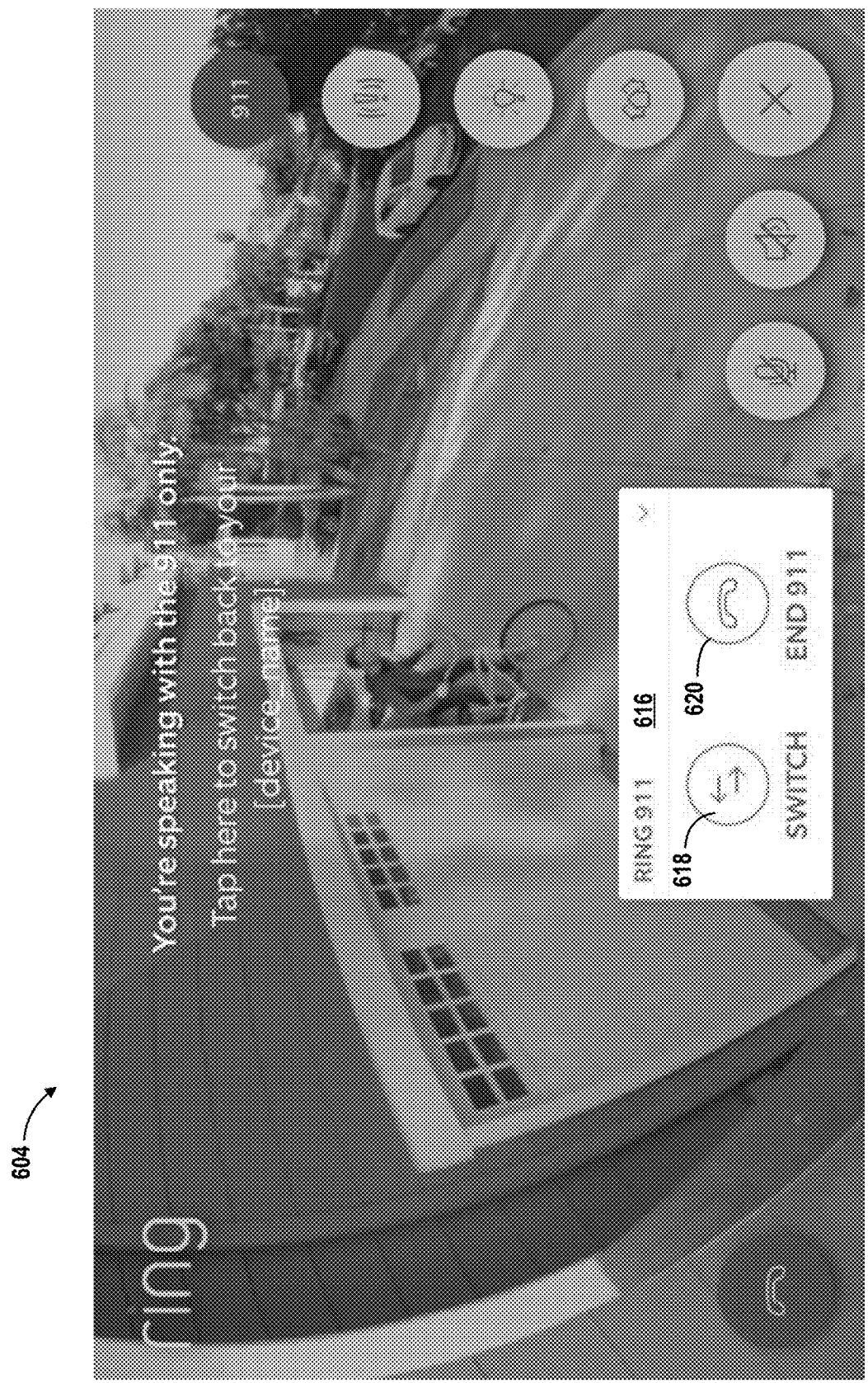

FIGS. 6A, 6B, and 6C are example user interface portions 600, 602, 604 in which video captured by an A/V recording and communication device 200 (FIGS. 1, 2) is displayed on a user client device 300 (FIGS. 1, 3).

FIG. 6A illustrates a still image 606, which may be part of a video stream provided to a user client device 300, captured by an A/V recording and communication device 200. The still image 606 is displayed in a user interface portion 600 that also includes, among other interface elements, an emergency call input 608. The interface portion 600 may be provided as part of an application executing on a user client device 300, in an embodiment. When selected, the emergency call input 608 may cause the application to either (1) cause a native phone application on the user client device 300 to dial an emergency number (e.g., 911 in the United States, or the equivalent number in another country); or (2) open a voice or data channel between the user client device 300 and a server that is configured to facilitate an emergency call between the user client device and emergency services (e.g., the server 124 (FIG. 1), API 122 (FIG. 1), or other element of the backend network 120 (FIG. 1)).

In the still image 606 of FIG. 6A, an individual appears to be removing a bicycle from a garage. The user—e.g., the owner, resident, etc. of the location depicted in the still image 606—may believe the individual is attempting to steal the bicycle. That is, the user may believe that the video (of which the still image 606 is a part) contains evidence of a crime. As a result, the user may select the emergency call input 608 on the user client device in order to contact the police and notify the police of the crime.

FIG. 6B illustrates a second user interface portion 602 that may be displayed responsive to the user selection of the emergency call input 608 (FIG. 6A). In response to user selection of the emergency call input 608, the user client device application may display a confirmation prompt 610 that includes a cancel input 612 and a call emergency services input 614. The confirmation prompt 610 may be presented in order to reduce accidental calls to emergency services by the user.

In response to the user selection of the call emergency services input 614 in the second user interface portion 602, or directly in response to user selection of the emergency call input 608 of the first user interface portion 600, the user client device 300 may cause a call to emergency services to be placed, as noted above. The user client device application may also cause a notification to be transmitted to a back-end server or system (e.g., the API 122 (FIG. 1)) to notify the back-end server or system that a call to emergency services has been placed. During the call, the user may be able to speak directly to emergency services personnel. In an embodiment, during the emergency call, the user may be able to continue to view the video from the A/V recording and communication device 200 on the user client device 300.

FIG. 6C illustrates a third user interface portion 604 that may be displayed during an emergency call to emergency services. The third interface portion 604 may include an in-emergency-call menu 616, which may include a switch microphone input 618 and an end emergency call input 620. User selection of the switch microphone input 618 may cause the user client device application to toggle the output of the audio stream from the microphone 314 on the user client device 300 between the emergency call and the A/V recording and communication device 200. Thus, by selecting the switch microphone input 618, the user may switch between speaking to emergency services personnel and speaking through the A/V recording and communication device 200 (e.g., to attempt to scare off the criminal, to speak to another person who has arrived within the field of view of the A/V recording and communication device 200, etc.).

A user's emergency call in response to a video stream from an A/V recording and communication device 200 may be an indication that the video contains evidence of a crime, or contains other information that may be useful to police or other emergency personnel or in an investigation. It may be desirable, in such situations, to automatically store the video for a period of time that is longer than a standard video storage policy to ensure that the video is available for later investigations and the like. FIG. 7 is an example method for such a scenario.

FIG. 7 is a flow chart illustrating an example method 700 of storing video images captured by a first A/V recording and communication device (e.g., the A/V recording and communication device 200). One or more portions of the method 700 may be performed by a server or back-end system, such as the backend API 122 of FIG. 1, for example. One or more portions of the method 700 may additionally or alternatively be performed by another computing device or system, such as the communication hub 116, for example. For ease of description, the method 700 will be described with respect to an embodiment in which all portions of the method are performed by a single back-end server. It should be understood, however, that the portions of the method may be performed by multiple computing devices and/or systems, in embodiments.

The method 700 may include, at block 702, the server receiving video images from a first A/V recording and communication device, wherein the first A/V recording and communication device is associated with a user and with a video image storage policy having a storage duration. For example, the video images may have been captured by one of the A/V recording and communication devices 500, 510, 520 of FIGS. 5A-5C, or by some other A/V recording and communication device 200.

The video images received from the A/V recording and communication device may be received substantially in real-time, in an embodiment. That is, the A/V recording and communication device may stream the video images to the server, such that the server performing the method 700 receives the images with little time lag between capture of the video images at the A/V recording and communication device and receipt of the video images at the server.

The method 700 may further include, at block 704, causing the video images to be transmitted to a client device associated with the first A/V recording and communication device (e.g., the user client device 300). For example, the server may cause the video images to be transmitted to the user client device by opening a data channel between the server and the user client device. The video images may then be displayed on or by the user client device, as illustrated in FIGS. 6A, 6B, and 6C, for example.

The method may further include, at block 706, receiving an indication from the client device of an emergency call placed on the client device in response to the video images. For example, a user may have selected an emergency call input on the user client device, as illustrated in FIGS. 6A and 6B. Upon user selection of such an input, the user client device may transmit a notification of the emergency call to the server. In some embodiments, the notification may be separate from an emergency call being placed through the phone functionality of the user client device. In other embodiments, the notification may accompany a request from the user client device for the server to cause a voice or data channel to be opened between the user client device and emergency services. In response to such a request, the server may open a voice or data channel between the user client device and emergency services for an emergency call.

The method 700 may further include, at block 708, causing the video images to be stored for a longer period of time than the storage duration responsive to the indication of an emergency call. Under normal circumstances, the server may cause video images captured by an A/V recording and communication device to be stored (e.g., in the cloud storage 126) for a period of time dictated by the storage policy associated with the A/V recording and communication device, or associated with the user or user account associated with the A/V recording and communication device. For example, a video may be transmitted to the cloud storage 126 for storage along with a deletion date, a number of days for storage, or another indicator of the storage duration. At the expiration of the storage duration, the server may normally cause the video to be deleted from the cloud storage 126, or may fail to prevent the cloud storage 126 from deleting the video, in some embodiments. In other embodiments, at the expiration of the storage duration, the video may be moved to an archive that is inaccessible to the user, or may otherwise be made inaccessible to the user. In contrast, in response to receiving an indication of an emergency call, the server may transmit the video to cloud storage with an indicator of a storage duration that is longer than the storage duration associated with the user account, user, etc. For example, in an embodiment, the storage duration associated with the video storage policy may be one week or less, and the server may cause the video associated with the emergency call to be stored for one month or more. In another embodiment, the storage duration associated with the video storage policy may be three months or less, and the server may cause the video associated with the emergency call to be stored for one year or more. In an embodiment, the server may cause the video associated with the emergency call to be stored indefinitely.

In addition to causing a video to be stored for longer than the storage duration of a video storage policy, further actions may be taken responsive to a user emergency call. Example actions are discussed with respect to the following portions of the method 700. Various embodiments of the method 700 may omit one or more of the following portions.

The method 700 may further include, at block 709, causing a notification to be transmitted to the user to notify the user of the storage and availability of the video images. The notification may be sent as a text message, email, push notification in an application associated with the A/V recording and communication device that captured the video images, or in any other appropriate electronic form.

The notification may include one or more of text, images, video, or other content. In some embodiments, the video images associated with the user's emergency call may be attached to the notification. The notification may advise the user that the video images have been captured responsive to the user's emergency call. The notification may, additionally or alternatively, advise the user that the storage policy associated with the video has been altered relative to a normal storage duration associated with other videos captured by the user's A/V recording and communication device.

In some embodiments, the notification may include a link to a webpage, server, etc. through which the user may view the video images associated with the user's emergency call. In an embodiment, a user associated with the A/V recording and communication device may not normally have access to stored video captured by the A/V recording and communication device. Instead, the user may only have access to a live video feed, for example. In such an embodiment, the notification may include a link to a webpage, server, etc. to which the user may not normally have access.

Figure 6D:
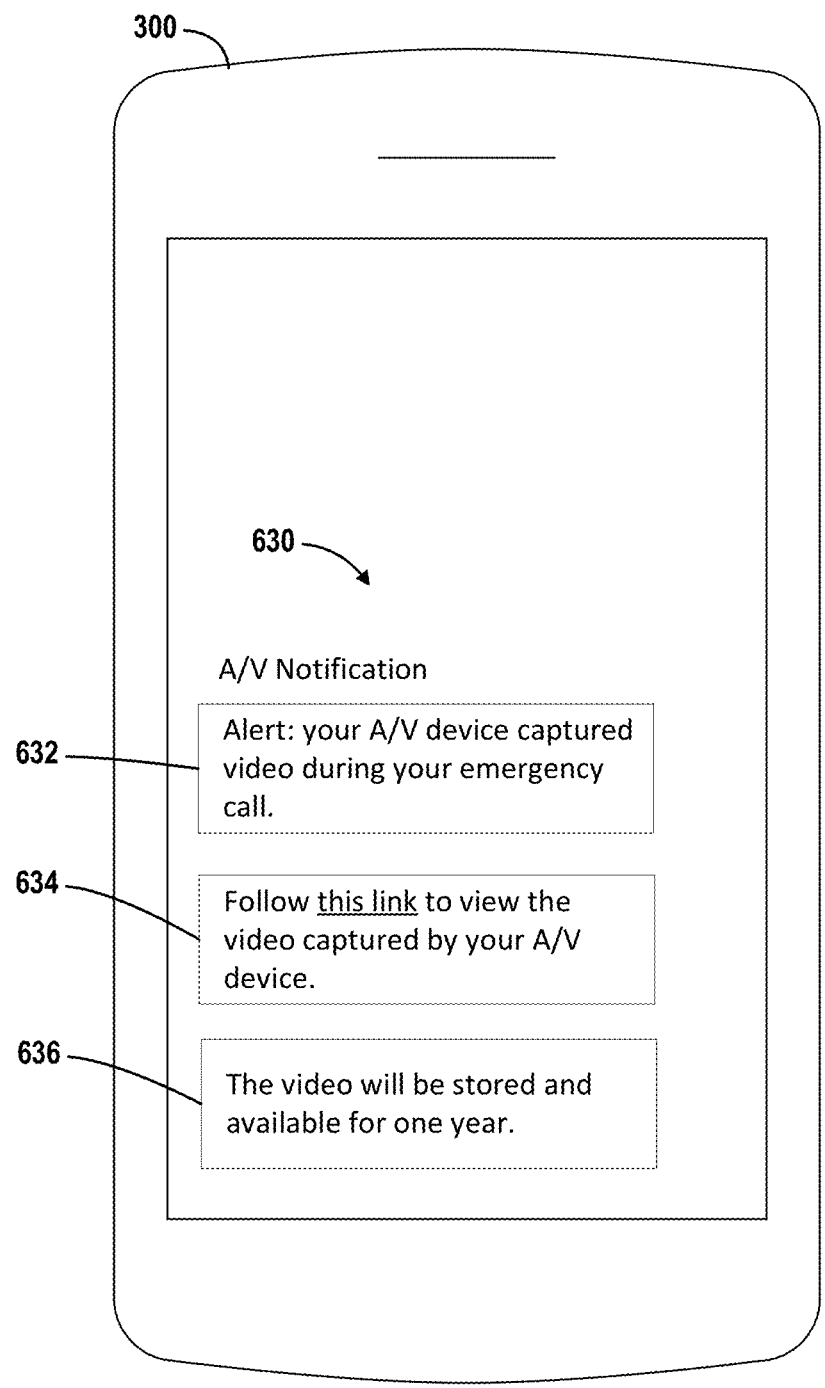
FIG. 6D is an example client device displaying an example user notification according to various aspects of present disclosure.

FIG. 6D illustrates an example of a notification 630 displayed on a user client device 300. The example notification includes three text messages 632, 634, 636. A first text message informs the user that the user's A/V device has captured video associated with the user's emergency call. A second text message 634 includes a hyperlink and informs the user that the video can be accessed by following the hyperlink. Finally, a third text message 636 informs the user that the video will be stored for one year, which is longer than the storage policy normally associated with the user's videos.

The method 700 may further include, at block 710, determining that the client device 300 is associated with a second A/V recording and communication device. As noted above, multiple A/V recording and communication devices may be installed at a single location and may be associated with the same user account, user, etc. Such an association may be used at the determining block 710.

The method 700 may further include, at block 712, transmitting an instruction to the second A/V recording and communication device to transition from a passive state to an active state. Although the first A/V recording and communication device may be actively capturing and transmitting video data to the server, other A/V recording and communication devices at the same location may be passive devices, which do not capture and/or transmit video in passive mode in order to reduce power consumption. Accordingly, an instruction may be sent to such a device to cause it to transition to an active state, in which the second A/V recording and communication device can capture and transmit video, in order to increase the chances of capturing additional video evidence of the event that caused the user to place an emergency call, or the aftermath of that event.

The method 700 may further include, at block 714, transmitting an instruction to the second A/V recording and communication device to upload second video images captured by the second A/V recording and communication device to the server. Whether the second A/V recording and communication device is an active device (which is always capturing video data) or a passive device (which only captures video data when switched from passive mode to active mode), the video data captured by the second A/V recording and communication device may include evidence of the event that caused the user to call emergency services. Accordingly, the server may cause the second A/V recording and communication device to transmit video data captured by the second A/V recording and communication device to the server for processing and/or storage. In an embodiment, the server may instruct the second A/V recording and communication device to transmit video data from the same time period for which video data from the first A/V recording and communication device was stored. The video data from the second A/V recording and communication device may also be stored for a period of time longer than the storage duration associated with the video storage policy, in an embodiment.

Blocks 712 and 714 were described above with respect to a second A/V recording and communication device that is associated with the same user, user account, and/or location as the first A/V recording and communication device. Additionally, or alternatively, the second A/V recording and communication device may be associated with a different user, user account, or location, but may be geographically proximate to the first A/V recording and communication device. For example, the second A/V recording and communication device may be located at a neighboring address to the first A/V recording and communication device, or at another location where it is possible or likely that evidence of the event that caused the user to place a call to emergency services may exist. For example, referring to the video still image of FIGS. 6A, 6B, and 6C, the bicycle may have been stolen from the user's garage, and video from A/V recording and communication devices at neighboring addresses may provide information about the thief's direction of escape, or other useful information, such as a clear image of the thief's face.

The method 700 may further include, at block 716, causing a notification to be transmitted to user to notify the user that the second A/V recording and communication device captured second video images. The notification may be the same as the notification caused to be transmitted at block 709, in some embodiments. In other embodiments, the notification at block 716 may be different from a notification sent according to block 709.

The notification at block 716 may be sent as a text message, email, push notification in an application associated with the A/V recording and communication device that captured the video images, or in any other appropriate electronic form. The notification may include one or more of text, images, video, or other content. In some embodiments, the video images captured by the second A/V recording and communication device may be attached to the notification. The notification may advise the user that the video images have been captured by the second A/V recording and communication device responsive to the user's emergency call.

In some embodiments, the notification may include a link to a webpage, server, etc. through which the user may view the second video images captured by the second A/V recording and communication device. In an embodiment, the user may not normally have access to stored video captured by the second A/V recording and communication device. Instead, the user may only have access to a live video feed, for example. In such an embodiment, the notification may include a link to a webpage, server, etc. to which the user may not normally have access.

The server may take even further action in response to the user-placed emergency call, in various embodiments. For example, in an embodiment, the server may transmit an instruction to a communication hub (e.g., the communication hub 116 of FIG. 1) to arm a security system at the location of the first A/V recording and communication device (e.g., to transition the security system from an unarmed state to an armed state, if the security system is not already in an armed state) in response to a user-placed emergency call.

In addition to a user-placed emergency call, other information may be indicative of a crime in a video captured by an A/V recording and communication device. For example, analysis of the video data itself may suggest that the video data includes evidence of criminal activity, such that it may be desirable to store the video for longer than the time dictated by the video storage policy associated with the A/V recording and communication device. FIG. 8, discussed below, provides an example method for such a situation.

FIG. 8 is a flow chart illustrating an example method 800 for storing video images captured by an audio/video A/V recording and communication device 200. Like the method 700 of FIG. 7, the method 800 of FIG. 8 may be performed, in whole or in part, by a server or back-end system, such as the backend API 122 of FIG. 1, for example. One or more portions of the method 800 may additionally or alternatively be performed by another computing device or system, such as the communication hub 116, for example. For ease of description, the method 800 will be described with respect to an embodiment in which all portions of the method are performed by a single back-end server. It should be understood, however, that portions of the method may be performed by multiple computing devices and/or systems, in various embodiments.

The method 800 may include, at block 802, receiving video images from a first A/V recording and communication device, wherein the first A/V recording and communication device is associated with a user and with a video image storage policy having a storage duration. The operations performed at the receiving block 802 of FIG. 8 may be substantially the same as those performed at the receiving block 702 of FIG. 7, in an embodiment.

The method 800 may further include, at block 804, applying an image analysis algorithm to the received video images. The image analysis algorithm may include, for example, one or more of the computer vision operations or functions described above to, e.g., determine if a known criminal is present in the video data, to detect if a door or window is forcibly opened, to detect if the camera of the A/V recording and communication device has been tampered with, or to detect other criminal activity. The method 800 may further include, at block 806, determining that the video images include evidence of a crime based on the image analysis.

In response to the determination that the video images include evidence of a crime, the method 800 may further include, at block 808, causing the video images to be stored for a longer period of time than the storage duration. The operations performed at the storing block 808 of the method 800 of FIG. 8 may be substantially the same as those performed at the storing block 708 of the method 700 of FIG. 7, in an embodiment.

In addition to causing the video data to be stored for a longer period of time than a storage duration of a video storage policy, the server may be configured to take other actions in response to a determination that the video contains evidence of a crime. Such other actions may be substantially the same as those described above with respect to the method 700 of FIG. 7.

The methods 700, 800 of FIGS. 7 and 8 are example methods of storing a video for longer than a storage duration of a video storage policy responsive to a user emergency call (FIG. 7) or automated image analysis of the video (FIG. 8). A server may be programmed to store a video for longer than a storage duration of a video storage policy as descried herein responsive to additional or alternative events, as well. For example, the server may be configured to store a video from an A/V recording and communication device for longer than a storage duration of a video storage policy responsive to a security system at or near the location of the A/V recording and communication device reporting an intrusion. Additionally, or alternatively, a server may be configured to store a video from an A/V recording and communication device for longer than a storage duration of a video storage policy responsive to a message over a police channel reporting a crime at or near the location of the A/V recording and communication device.

The methods 700, 800 of FIGS. 7 and 8 address storage of a video for longer than the storage duration of a video storage policy from the perspective of a server. The method of FIG. 9 addresses an embodiment of accessing a video, from the perspective of a client device 300, after the video would normally have been deleted pursuant to a video storage policy.

FIG. 9 is a flow chart illustrating an example method 900 of retrieving video images captured by an A/V recording and communication device, such as the A/V recording and communication device 200 (FIG. 1), for example. The method 900 of FIG. 9 may be performed, in whole or in part, by a user client device, such as the user client device 300, for example. One or more portions of the method 900 may additionally or alternatively be performed by another computing device or system. For ease of description, the method 900 will be described with respect to an embodiment in which all aspects of the method are performed by a single user client device. It should be understood, however, that the portions of the method 900 may be performed by multiple computing devices and/or systems, in embodiments.

The method 900 may include, at block 902, receiving video images captured by an A/V recording and communication device, the A/V recording and communication device associated with a video image storage policy having a storage duration. The user client device may receive the video images by way of a back-end server (e.g., the server 124 or other element of the backend network 120 (FIG. 1)), in various embodiments. Additionally, or alternatively, the user client device may receive the video images by way of a communications hub deployed at the same location as the A/V recording and communication device, in an embodiment. In yet other embodiments, the user client device may receive the video images directly from the A/V recording and communication device. The video images may be streamed from the A/V recording and communication device to the client device, in an embodiment, such that the user client device receives the video images substantially in real time.

The method 900 may further include, at block 904, displaying the video images. As shown in FIGS. 6A, 6B, and 6C, for example, the video images may be displayed in a user interface portion 600, 602, 604 of the user client device. In various embodiments, the video images may be displayed within an application associated with the A/V recording and communication device. Also as shown in FIG. 6A, the video images may be displayed in an interface portion having, among other inputs, an emergency call input 608.

The method 900 may further include, at block 906, receiving, at a first time, an instruction from a user to place an emergency call in response to displaying the video images. The instruction may be received by the user client device from the user through an input device of the user client device, such as a touch screen, mouse, etc. As discussed above with respect to FIGS. 6A and 6B, the instruction may be a user selection of an emergency call input 608 in a user interface or a call emergency services input 614, for example, or a similar input.

The method 900 may further include, at block 908, causing a voice or data channel to be opened on the client device for the emergency call. In some embodiments, the user client device may cause a voice channel to be opened for the emergency call by invoking the native phone application on the user client device. Alternatively, in other embodiments, the user client device may cause a voice or data channel to be opened by contacting a back-end server with an instruction or request to open such a voice or data channel.

The method 900 may further include, at block 910, retrieving, at a second time, the video images from a remote storage device, wherein a passage of time from the first time to the second time is greater than the storage duration. In other words, the operations at the retrieving block 910 may occur at a point in time after the video normally would have been deleted under the video storage policy. The video may have been stored and made available for longer than the duration in the video storage policy responsive to the user instruction to place an emergency call at block 906, in an embodiment, as described above with respect to the method 700 of FIG. 7, for example.

In an embodiment, the user client device 300 may be able to access the video after the expiration of the storage duration of the video storage policy specifically because the video is associated with an emergency call by a back-end server. In contrast, if the user client device attempts to access a second video, which is not associated with any emergency call, after expiration of the storage duration of the video storage policy for the second video, the user client device may be denied access to the second video. In other words, the client device may receive second video images captured by the A/V recording and communication device at a third time, wherein the second video images are not associated with any emergency call by the user, the user client device may attempt to retrieve the second video images at a fourth time, wherein a passage of time from the third time to the fourth time is greater than the storage duration, and the user client device may receive an indication that the second video images are not available.

As described above, the present embodiments leverage the capabilities of audio/video (A/V) recording and communication devices, thereby advantageously capturing video with A/V recording and communication devices and automatically extending the storage duration of video when it is determined that the video may include evidence of a crime. As a result, such video may be available for investigation and other purposes. These capabilities permit the devices to reduce crime and increase public safety.

The various embodiments of the present automatic alteration of the storage duration of a video containing evidence of crime have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," a person of skill in the art will understand how the features of the present embodiments provide the advantages described herein.

Automated deletion of video data captured by an A/V recording and communication device based on a video storage policy may result in inadvertent destruction of evidence of a crime, or of video data that may otherwise be useful in an investigation. The present embodiments solve this problem by extending the storage duration for a video when user input, video analysis, and/or other information indicates that the video includes evidence of a crime.

In a first aspect, a server-implemented method for storing video images captured by an audio/video (A/V) recording and communication device is provided. The method may include receiving the video images at the server, wherein the A/V recording and communication device that captured the video images is associated with a video image storage policy having a storage duration, causing the video images to be transmitted to a client device associated with the A/V recording and communication device, receiving an indication from the client device of an emergency call placed on the client device in response to the video images, and in response to the indication of an emergency call, causing the video images to be stored for a longer period of time than the storage duration.

In an embodiment of the first aspect, receiving the indication from the client device of the emergency call placed on the client device in response to the video images may include receiving an emergency call instruction from the client device, and opening a voice channel between the client device and an emergency services provider.

In an embodiment of the first aspect, the storage duration is one week or less, and the longer period of time is one month or more.

In an embodiment of the first aspect, the storage duration is three months or less, and the longer period of time is one year or more.

In an embodiment of the first aspect, the A/V recording and communication device is a first A/V recording and communication device, the video images are first video images and are associated with a time period, and the method further may further include determining that the client device is associated with a second A/V recording and communication device, and transmitting an instruction to the second A/V recording and communication device to upload second video images captured by the second A/V recording and communication device, the second video images associated with the time period.

In an embodiment of the first aspect, the A/V recording and communication device is a first A/V recording and communication device, the video images are first video images, and the method may further include determining that the client device is associated with a second A/V recording and communication device, wherein the second A/V recording and communication device is a passive A/V device, and transmitting an instruction to the second A/V recording and communication device to transition to an active state in which the second A/V recording and communication device captures second video images.

In an embodiment of the first aspect, the A/V recording and communication device is deployed at a location, and the method may further include transmitting an instruction to a security system deployed at the location to enter an armed state.

In an embodiment of the first aspect, the A/V recording and communication device is a first A/V recording and communication device and is deployed at a location, the client device is associated with a user, and the method may further include determining that a second A/V recording and communication device is deployed near the location, wherein the second A/V recording and communication device is not associated with the user, and transmitting an instruction to the second A/V recording and communication device to transition to an active state in which the second A/V recording and communication device captures second video images.

In an embodiment of the first aspect, the A/V recording and communication device is a first A/V recording and communication device and is deployed at a location, the client device is associated with a user, the video images are first video images and are associated with a time period, and the method may further include determining that a second A/V recording and communication device is deployed near the location, wherein the second A/V recording and communication device is not associated with the user, and transmitting an instruction to the second A/V recording and communication device to upload second video images captured by the second A/V recording and communication device, the second video images associated with the time period.

In an embodiment of the first aspect, the A/V recording and communication device is a first A/V recording and communication device and is deployed at a location, the client device is associated with a user, the video images are first video images, and the method may further include determining that a second A/V recording and communication device is deployed near the location, wherein the second A/V recording and communication device is not associated with the user, and transmitting an instruction to the second A/V recording and communication device to transition to an active state in which the second A/V recording and communication device captures second video images.

In an embodiment of the first aspect, the method may further include causing a notification to the transmitted to the client device in response to the indication of the emergency call, the notification comprising an indication of the longer period of time.

In a second aspect, a method of retrieving video images captured by an audio/video (A/V) recording and communication device is provided. The method may include receiving, at a client device, video images captured by the A/V recording and communication device, the A/V recording and communication device associated with a video image storage policy having a storage duration, displaying the video images on the client device, receiving, at the client device at a first time, an instruction from a user to place an emergency call in response to displaying the video images on the client device, and retrieving, by the client device at a second time, the video images from a remote storage device, wherein a passage of time from the first time to the second time is greater than the storage duration.

In an embodiment of the second aspect, the video images are first video images, and the method may further include receiving, at the client device, second video images captured by the A/V recording and communication device at a third time, wherein the second video images are not associated with any emergency call by the user, attempting to retrieve the second video images at a fourth time, wherein a passage of time from the third time to the fourth time is greater than the storage duration, and receiving, at the client device, an indication that the second video images are not available.

In an embodiment of the second aspect, the method may further include, in response to the instruction from the user to place the emergency call, causing a voice or data channel to be opened on the client device for the emergency call.

In a third aspect, a server-implemented method for storing video images captured by an audio/video (A/V) recording and communication device is provided. The method may include receiving the video images at the server, wherein the A/V recording and communication device that captured the video images is associated with a video image storage policy having a storage duration, applying an imaging analysis algorithm to the video images to determine that the video images include evidence of a crime and, in response to determining that the video images include evidence of a crime, causing the video images to be stored for a longer period of time than the storage duration.

In an embodiment of the third aspect, the method may further include causing a notification of the crime to be transmitted to a client device associated with the A/V recording and communication device.

In an embodiment of the third aspect, the storage duration is one week or less, and the longer period of time is one month or more.

In an embodiment of the third aspect, wherein the storage duration is three months or less and the longer period of time is one year or more.

In an embodiment of the third aspect, the A/V recording and communication device is a first A/V recording and communication device, the video images are first video images and are associated with a time period, and the method may further include determining that the client device is associated with a second A/V recording and communication device, and transmitting an instruction to the second A/V recording and communication device to upload second video images captured by the second A/V recording and communication device, the second video images associated with the time period.

In an embodiment of the third aspect, the A/V recording and communication device is a first A/V recording and communication device, the video images are first video images, and the method may further include determining that the client device is associated with a second A/V recording and communication device, wherein the second A/V recording and communication device is a passive A/V device, and transmitting an instruction to the second A/V recording and communication device to transition to an active state in which the second A/V recording and communication device captures second video images.

In an embodiment of the third aspect, the A/V recording and communication device is deployed at a location, and the method may further include transmitting an instruction to a security system deployed at the location to enter an armed state.

In an embodiment of the third aspect, the A/V recording and communication device is a first A/V recording and communication device and is deployed at a location, the client device is associated with a user, and the method may further include determining that a second A/V recording and communication device is deployed near the location, wherein the second A/V recording and communication device is not associated with the user, and transmitting an instruction to the second A/V recording and communication device to transition to an active state in which the second A/V recording and communication device captures second video images.

In an embodiment of the third aspect, the A/V recording and communication device is a first A/V recording and communication device and is deployed at a location, the client device is associated with a user, the video images are first video images and are associated with a time period, and the method may further include determining that a second A/V recording and communication device is deployed near the location, wherein the second A/V recording and communication device is not associated with the user, and transmitting an instruction to the second A/V recording and communication device to upload second video images captured by the second A/V recording and communication device, the second video images associated with the time period.

In an embodiment of the third aspect, the A/V recording and communication device is a first A/V recording and communication device and is deployed at a location, the client device is associated with a user, the video images are first video images, and the method may further include determining that a second A/V recording and communication device is deployed near the location, wherein the second A/V recording and communication device is not associated with the user, and transmitting an instruction to the second A/V recording and communication device to transition to an active state in which the second A/V recording and communication device captures second video images.

In a fourth aspect, a non-transitory computer-readable medium storing instructions that, when executed by a processor, cause the processor to perform a method of retrieving video images captured by an audio/video (A/V) recording and communication device, is provided. The method may include receiving, at a client device, video images captured by the A/V recording and communication device, the A/V recording and communication device associated with a video image storage policy having a storage duration, displaying the video images on the client device, receiving, at the client device at a first time, an instruction from a user to place an emergency call in response to displaying the video images on the client device, and retrieving, by the client device at a second time, the video images from a remote storage device, wherein a passage of time from the first time to the second time is greater than the storage duration.

In an embodiment of the fourth aspect, the video images are first video images, and the method may further include receiving, at the client device, second video images captured by the A/V recording and communication device at a third time, wherein the second video images are not associated with any emergency call by the user, attempting to retrieve the second video images at a fourth time, wherein a passage of time from the third time to the fourth time is greater than the storage duration, and receiving, at the client device, an indication that the second video images are not available.

In an embodiment of the fourth aspect, the method may further include, in response to the instruction from the user to place the emergency call, causing a voice or data channel to be opened on the client device for the emergency call.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

While various aspects and implementations have been disclosed herein, other aspects and implementations will be apparent to those skilled in the art. The present embodiments are susceptible to modifications and alternate constructions from those discussed above. Consequently, the present invention is not limited to the particular embodiments disclosed. Rather, numerous modifications and alternate constructions fall within the spirit and scope of the present disclosure. For example, those skilled in the art will appreciate that other arrangements and other elements (e.g. machines, interfaces, operations, orders, and groupings of operations, etc.) can be used instead, and some elements may be omitted altogether according to the desired results.

Further, many of the elements that are described are functional entities that may be implemented as discrete or distributed components or in conjunction with other components, in any suitable combination and location, or other structural elements described as independent structures may be combined. The steps, aspects, and portions of the processes described herein need not be performed in the same order as they have been presented, and may be performed in any order(s) unless logic dictates a particular order. Further, steps, aspects, or portions that have been presented as being performed separately may in alternative embodiments be performed concurrently. Likewise, steps, portions, or aspects that have been presented as being performed concurrently may in alternative embodiments be performed separately. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A server-implemented method for storing video images captured by an audio/video (A/V) recording and communication device, the method comprising:
   receiving the video images at the server, wherein the A/V recording and communication device that captured the video images is associated with a video image storage policy having a storage duration;
   causing the video images to be transmitted to a client device associated with the A/V recording and communication device;
   receiving an indication from the client device of an emergency call placed on the client device in response to the video images; and
   in response to the indication of an emergency call, causing the video images to be stored for a longer period of time than the storage duration.

2. The method of claim 1, wherein receiving the indication from the client device of the emergency call placed on the client device in response to the video images comprises:
   receiving an emergency call instruction from the client device; and
   opening a voice channel between the client device and an emergency services provider.

3. The method of claim 1, wherein the A/V recording and communication device is a first A/V recording and communication device, wherein the video images are first video images and are associated with a time period, the method further comprising:
   determining that the client device is associated with a second A/V recording and communication device; and
   transmitting an instruction to the second A/V recording and communication device to upload second video images captured by the second A/V recording and communication device, the second video images associated with the time period.

4. The method of claim 1, wherein the A/V recording and communication device is a first A/V recording and communication device, wherein the video images are first video images, the method further comprising:
   determining that the client device is associated with a second A/V recording and communication device, wherein the second A/V recording and communication device is a passive A/V device; and
   transmitting an instruction to the second A/V recording and communication device to transition to an active state in which the second A/V recording and communication device captures second video images.

5. The method of claim 1, wherein the A/V recording and communication device is deployed at a location, the method further comprising:
   transmitting an instruction to a security system deployed at the location to enter an armed state.

6. The method of claim 1, wherein the A/V recording and communication device is a first A/V recording and communication device and is deployed at a location, and wherein the client device is associated with a user, the method further comprising:
   determining that a second A/V recording and communication device is deployed near the location, wherein the second A/V recording and communication device is not associated with the user; and
   transmitting an instruction to the second A/V recording and communication device to transition to an active state in which the second A/V recording and communication device captures second video images.

7. The method of claim 1, wherein the A/V recording and communication device is a first A/V recording and communication device and is deployed at a location, wherein the client device is associated with a user, and wherein the video images are first video images and are associated with a time period, the method further comprising:
   determining that a second A/V recording and communication device is deployed near the location, wherein the second A/V recording and communication device is not associated with the user; and
   transmitting an instruction to the second A/V recording and communication device to upload second video images captured by the second A/V recording and communication device, the second video images associated with the time period.

8. The method of claim 1, wherein the A/V recording and communication device is a first A/V recording and communication device and is deployed at a location, wherein the client device is associated with a user, and wherein the video images are first video images, the method further comprising:
   determining that a second A/V recording and communication device is deployed near the location, wherein the second A/V recording and communication device is not associated with the user; and
   transmitting an instruction to the second A/V recording and communication device to transition to an active state in which the second A/V recording and communication device captures second video images.

9. The method of claim 1, further comprising causing a notification to be transmitted to the client device in response to the indication of the emergency call, the notification comprising an indication of the longer period of time.

10. A method of retrieving video images captured by an audio/video (A/V) recording and communication device, the method comprising:
   receiving, at a client device, video images captured by the A/V recording and communication device, the A/V recording and communication device associated with a video image storage policy having a storage duration;
   displaying the video images on the client device;
   receiving, at the client device at a first time, an instruction from a user to place an emergency call in response to displaying the video images on the client device; and retrieving, by the client device at a second time, the video images from a remote storage device, wherein a passage of time from the first time to the second time is greater than the storage duration.

11. The method of claim 10, wherein the video images are first video images, the method further comprising:
receiving, at the client device, second video images captured by the A/V recording and communication device at a third time, wherein the second video images are not associated with any emergency call by the user;
attempting to retrieve the second video images at a fourth time, wherein a passage of time from the third time to the fourth time is greater than the storage duration; and
receiving, at the client device, an indication that the second video images are not available.

12. The method of claim 10, wherein the method further comprises:
in response to the instruction from the user to place the emergency call, causing a voice or data channel to be opened on the client device for the emergency call.

13. A server-implemented method for storing video images captured by an audio/video (A/V) recording and communication device, the method comprising:
receiving the video images at the server, wherein the A/V recording and communication device that captured the video images is associated with a video image storage policy having a storage duration;
applying an image analysis algorithm to the video images to determine that the video images include evidence of a crime; and
in response to determining that the video images include evidence of a crime based on the application of the image analysis algorithm, causing the video images to be stored for a longer period of time than the storage duration.

14. The method of claim 13, further comprising:
causing a notification of the crime to be transmitted to a client device associated with the A/V recording and communication device.

15. The method of claim 13, wherein the A/V recording and communication device is a first A/V recording and communication device, wherein the video images are first video images and are associated with a time period, the method further comprising:
determining that the client device is associated with a second A/V recording and communication device; and
transmitting an instruction to the second A/V recording and communication device to upload second video images captured by the second A/V recording and communication device, the second video images associated with the time period.

16. The method of claim 13, wherein the A/V recording and communication device is a first A/V recording and communication device, wherein the video images are first video images, the method further comprising:
determining that the client device is associated with a second A/V recording and communication device, wherein the second A/V recording and communication device is a passive A/V device; and
transmitting an instruction to the second A/V recording and communication device to transition to an active state in which the second A/V recording and communication device captures second video images.

17. The method of claim 13, wherein the A/V recording and communication device is deployed at a location, the method further comprising:
transmitting an instruction to a security system deployed at the location to enter an armed state.

18. The method of claim 13, wherein the A/V recording and communication device is a first A/V recording and communication device and is deployed at a location, and wherein the client device is associated with a user, the method further comprising:
determining that a second A/V recording and communication device is deployed near the location, wherein the second A/V recording and communication device is not associated with the user; and
transmitting an instruction to the second A/V recording and communication device to transition to an active state in which the second A/V recording and communication device captures second video images.

19. The method of claim 13, wherein the A/V recording and communication device is a first A/V recording and communication device and is deployed at a location, wherein the client device is associated with a user, and wherein the video images are first video images and are associated with a time period, the method further comprising:
determining that a second A/V recording and communication device is deployed near the location, wherein the second A/V recording and communication device is not associated with the user; and
transmitting an instruction to the second A/V recording and communication device to upload second video images captured by the second A/V recording and communication device, the second video images associated with the time period.

20. The method of claim 13, wherein the A/V recording and communication device is a first A/V recording and communication device and is deployed at a location, wherein the client device is associated with a user, and wherein the video images are first video images, the method further comprising:
determining that a second A/V recording and communication device is deployed near the location, wherein the second A/V recording and communication device is not associated with the user; and
transmitting an instruction to the second A/V recording and communication device to transition to an active state in which the second A/V recording and communication device captures second video images.

* * * * *